(12) United States Patent
Yoshimoto et al.

(10) Patent No.: US 11,331,573 B2
(45) Date of Patent: May 17, 2022

(54) SYSTEM AND METHOD FOR AN EMULATOR EXECUTING A SECONDARY APPLICATION USING ROM GAME IMAGES

(71) Applicant: NINTENDO CO., LTD., Kyoto (JP)

(72) Inventors: Hirohito Yoshimoto, Kyoto (JP); Tomohiro Kawase, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/077,099

(22) Filed: Oct. 22, 2020

(65) Prior Publication Data
US 2021/0275920 A1     Sep. 9, 2021

(30) Foreign Application Priority Data
Mar. 4, 2020   (JP) ............................. JP2020-037015

(51) Int. Cl.
*A63F 13/537*   (2014.01)

(52) U.S. Cl.
CPC .................. *A63F 13/537* (2014.09)

(58) Field of Classification Search
CPC ........ A63F 13/35; A63F 13/95; A63F 13/537; A63F 13/69; A63F 13/88
See application file for complete search history.

(56) References Cited

U.S. PATENT DOCUMENTS

| | | | |
|---|---|---|---|
| 2001/0031665 A1 | 10/2001 | Taho et al. | |
| 2007/0197273 A1* | 8/2007 | Suzuki | A63F 3/00006 463/1 |
| 2009/0137321 A1* | 5/2009 | Katsu | A63F 13/85 463/42 |
| 2009/0143137 A1* | 6/2009 | Asano | A63F 13/88 463/23 |
| 2009/0149232 A1* | 6/2009 | Gosztyla | A63F 13/10 463/7 |
| 2013/0120569 A1 | 5/2013 | Mizuta | |
| 2014/0066177 A1* | 3/2014 | Zalewski | A63F 13/60 463/24 |
| 2014/0094314 A1* | 4/2014 | Watson | A63F 13/70 463/42 |

(Continued)

FOREIGN PATENT DOCUMENTS

| | | |
|---|---|---|
| JP | 2001-340641 A | 12/2001 |
| JP | 2007-075466 | 3/2007 |

(Continued)

OTHER PUBLICATIONS

Japanese Office Action issued in Japanese Application No. 2020-037015 dated Apr. 5, 2022 with English machine translation (15 pages).

*Primary Examiner* — Steve Rowland
(74) *Attorney, Agent, or Firm* — Nixon & Vanderhye P.C.

(57) ABSTRACT

An information processing apparatus includes: a storage medium storing at least ROM data for a game and an emulator program for executing the game based on the ROM data; and a processor. In a first mode, the processor executes game processing by an emulator, and in a second mode, the processor, while executing game processing based on the emulator, executes an application which is different from the game processing and in which at least some of game images included in the ROM data are displayed, by making a change on data to be processed by the emulator being executed.

28 Claims, 24 Drawing Sheets

(56) References Cited

U.S. PATENT DOCUMENTS

| | | | | |
|---|---|---|---|---|
| 2014/0141888 A1* | 5/2014 | Pavlish | ............... | G07F 17/3276 |
| | | | | 463/42 |
| 2014/0155153 A1* | 6/2014 | Ye | ........................... | A63F 13/60 |
| | | | | 463/31 |
| 2014/0179439 A1* | 6/2014 | Miura | ................ | A63F 13/2145 |
| | | | | 463/42 |
| 2014/0187314 A1* | 7/2014 | Perry | ..................... | A63F 13/79 |
| | | | | 463/29 |
| 2014/0274371 A1* | 9/2014 | Helava | ................... | A63F 13/88 |
| | | | | 463/31 |
| 2015/0119143 A1* | 4/2015 | Kuroda | ................ | A63F 13/537 |
| | | | | 463/31 |
| 2017/0036109 A1 | 2/2017 | Matsumoto | | |
| 2017/0312640 A1* | 11/2017 | Watson | ................... | A63F 13/45 |
| 2019/0270020 A1* | 9/2019 | Miura | ..................... | A63F 13/86 |

FOREIGN PATENT DOCUMENTS

| | | |
|---|---|---|
| JP | 2013-102842 A | 5/2013 |
| JP | 2017-29509 A | 2/2017 |

\* cited by examiner

| 423 | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| 17 | 18 | 19 | 20 | 21 | 22 | 23 | 24 | 25 | 26 | 27 | 28 | 29 | 30 | 31 | 32 |

⋮

| 225 | 226 | 227 | 228 | 229 | 230 | 231 | 232 | 233 | 234 | 235 | 236 | 237 | 238 | 239 | 240 |
| 241 | 242 | 243 | 244 | 245 | 246 | 247 | 248 | 249 | 250 | 251 | 252 | 253 | 254 | 255 | 256 |

TILE NUMBER   1   2   3   4   5   6   7   8   9

Fig. 13
| EVENT NUMBER | OCCURRENCE CONDITION INFORMATION | EVENT CONTENT INFORMATION | ACTION CONTROL DATA |
|---|---|---|---|
| 01 | .... | ... | ... |
| 02 | .... | ... | ... |
| ⋮ | ⋮ | ⋮ | ⋮ |
Fig. 16
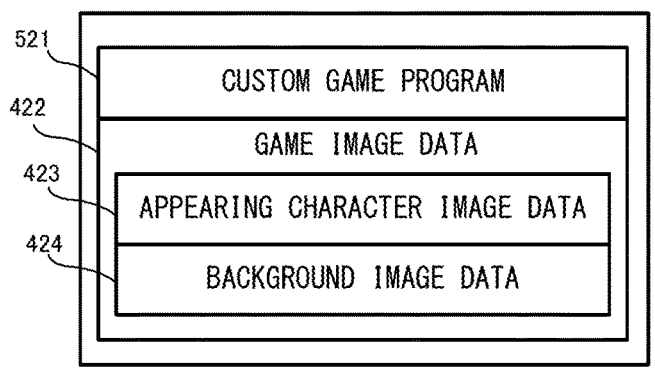
Fig. 18
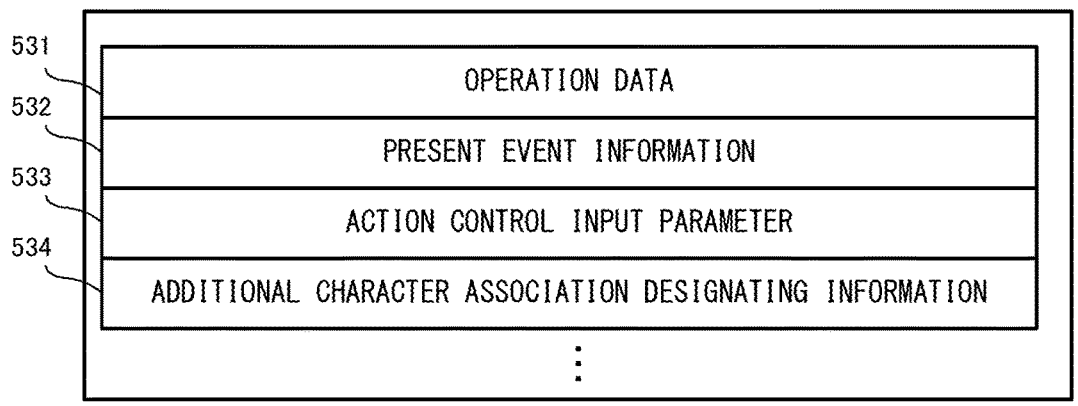

APPEARANCE POSITION
(DESIGNATED POSITION OUTSIDE SCREEN)

SYSTEM AND METHOD FOR AN EMULATOR EXECUTING A SECONDARY APPLICATION USING ROM GAME IMAGES

CROSS REFERENCE TO RELATED APPLICATION

This application claims priority to Japanese Patent Application No. 2020-037015 filed on Mar. 4, 2020, the entire contents of which are incorporated herein by reference.

FIELD

The exemplary embodiments relate to an information processing apparatus, an information processing system, a computer-readable non-transitory storage medium having stored therein an information processing program, and an information processing method in which an emulator program for executing game processing based on ROM data runs.

BACKGROUND AND SUMMARY

Conventionally, there has been known an information processing apparatus having stored therein an emulator program and a plurality of ROM data of games. In this apparatus, operation of a game apparatus released in the past can be reproduced by an emulator program, whereby it is possible to play a plurality of installed games.

The information processing apparatus as described above merely enables play of a game using an emulator. Thus, such an idea as further utilizing various contents (e.g., player character) included in the game has not been considered.

Accordingly, an object of the exemplary embodiments is to provide an information processing apparatus and the like that, as well as merely enabling play of a game using an emulator, enable execution of another application utilizing contents of the game.

Configuration examples for achieving the above object will be shown below.

One configuration example is an information processing apparatus including a storage medium and a processor. The storage medium stores at least ROM data for a game and an emulator program for executing the game on the basis of the ROM data. The processor is configured to: in a first mode, execute game processing based on the ROM data by the emulator program; and in a second mode, while causing the emulator program to execute game processing based on the ROM data, execute an application which is different from the game processing and in which at least some of game images included in the ROM data are displayed, by making a change on data to be processed by the emulator program being executed.

According to the above configuration example, it is possible to provide an information processing apparatus that allows play of a game using an emulator and further enables execution of another application relevant to the game by utilizing ROM data of the game. Thus, instead of creating the whole application from the beginning, the ROM data and the behavior of the emulator are utilized, whereby the amount of data can be reduced. In addition, the development cost is reduced and reproducibility for operation of the original game can be enhanced.

In another configuration example, the ROM data may include at least background image data and character image data, and the emulator program may be configured to execute the game by generating a background image and a character image on the basis of the ROM data, controlling a character associated with the character image, and displaying a game screen including at least the background image and the character image.

In another configuration example, in the first mode, the processor may cause the emulator program to control at least a player character among the characters, and in the second mode, the processor may execute the application in which at least the character image associated with the player character is displayed.

According to the above configuration example, the first mode allows a user to enjoy a game in which the user operates a player character, and the second mode can provide the user with another application in which the player character appears. Thus, it becomes possible to provide an application utilizing a player character that appears in the original game.

In another configuration example, in the second mode, the processor may, while having made a change of locating the player character at a predetermined position, cause the emulator program to control the player character.

According to the above configuration example, in the second mode, the degree of freedom of the display/arrangement position of the player character can be enhanced and reproducibility for the behavior of the player character can be enhanced.

In another configuration example, in the first mode, the processor may cause the emulator program to control the player character on the basis of key data inputted from an operation unit, and in the second mode, the processor may, while having made a change of inputting the key data in a pseudo manner, cause the emulator program to control the player character.

According to the above configuration example, an input of an operation for the player character is performed in a pseudo manner, and the action control therefor is performed by the emulator program. Thus, in the second mode, while the player character is automatically caused to perform an action, reproducibility for the behavior in the game processing based on the ROM data can be enhanced, whereby it becomes possible to make an expression with which the user does not feel strange.

In another configuration example, in the second mode, the processor may, while having made a change of locating at least one non-player character other than the player character among the characters at a predetermined position, cause the emulator program to control the player character and the non-player character.

According to the above configuration example, in the second mode, the degree of freedom of the arrangement positions of non-player characters is ensured, and the behaviors of the non-player characters can be realized with high reproducibility based on their behaviors in game processing based on the ROM data.

In another configuration example, processing executed by the emulator program may include processing of collision detection between the characters.

According to the above configuration example, reproducibility for various behaviors when characters collide with each other can be enhanced in the second mode.

In another configuration example, the storage medium may further store an additional character image separately from the character image included in the ROM data, and in the second mode, the processor may change the character image of the character controlled by the emulator program during execution of the game processing, to the additional character image, and display the additional character image.

According to the above configuration example, in the second mode, action control for the characters is performed using processing by the emulator program, and in display output based on the result of the above processing, images of the characters are replaced with images of the additional characters. Thus, it becomes possible to make an expression using a new character that is not present in the original game while utilizing the emulator processing, whereby an application that does not bore the user can be provided.

In another configuration example, the storage medium may further store additional background image data separately from the background image data included in the ROM data, and the processor may display an image using the additional background image data, as at least a part of the background image displayed in the second mode.

According to the above configuration example, in the second mode, it becomes possible to make an expression using a background image that is not present in the original game while utilizing the emulator processing, whereby an application that does not bore the user can be provided.

In another configuration example, the application in the second mode may be a clock application.

In another configuration example, the application in the second mode may be a clock application, and in the second mode, the processor may arrange a plurality of the non-player characters in a shape representing a time.

In another configuration example, the application in the second mode may be a clock application, and in the second mode, the processor may display an image representing a time by using the additional background image data.

In another configuration example, in the second mode, the processor may further cause a predetermined event in accordance with a fact that a specific time has come.

According to the above configuration example, in the second mode, various events can be executed in accordance with times, whereby the user can be amused.

In another configuration example, the information processing apparatus may further include a switching operation unit for performing a command for mode switching. Further, the processor may perform the mode switching in accordance with an operation to the switching operation unit, save a state of the game processing during a play, when shifting from the first mode to another mode, and restart the game processing from the saved state, when shifting from the other mode to the first mode.

According to the above configuration example, while the user plays a game in the first mode, if the first mode is switched to another mode and then the mode is returned to the first mode, it is possible to restart the play from the game state at the time of the last switching. Thus, convenience for the user when playing the game in the first mode can be enhanced.

In another configuration example, the information processing apparatus may be a hand-held apparatus further including a display configured to display an image and an operation unit for playing the game.

According to the exemplary embodiments, it is possible to provide an information processing apparatus that allows play of a game using an emulator and further enables execution of another application relevant to the game by utilizing ROM data of the game.

BRIEF DESCRIPTION OF THE DRAWINGS

FIG. 13 shows a non-limiting example of the data configuration of event definition data 408;

FIG. 16 shows a non-limiting example of the data configuration of custom ROM data 504;

FIG. 18 shows a non-limiting example of the data configuration of second mode processing working data 415;

DETAILED DESCRIPTION OF NON-LIMITING EXAMPLE EMBODIMENTS

Hardware Configuration of Information Processing Terminal

Figure 1:
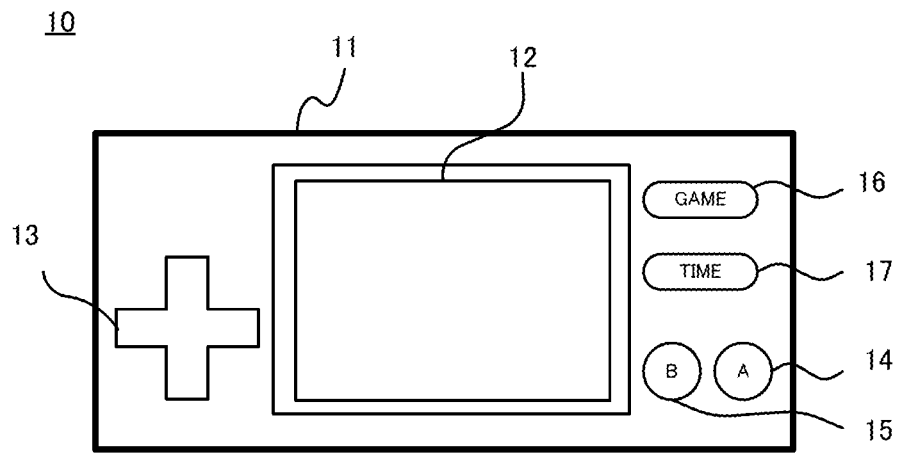
FIG. 1 is a schematic view showing a non-limiting example of the outer appearance of an information processing apparatus 10 according to an exemplary embodiment.

Hereinafter, an exemplary embodiment of the present disclosure will be described. FIG. 1 is a view showing the outer appearance of an information processing apparatus 10 in which processing is executed in the exemplary embodiment. The information processing apparatus 10 includes a substantially plate-shaped housing 11. In the exemplary embodiment, the main surface of the housing 11 (in other words, the front surface on which a display 12 is provided) roughly has a rectangular shape. It is noted that the shape and the size of the housing 11 may be optionally set. As an example, the housing 11 may have a portable size.

As shown in FIG. 1, the information processing apparatus 10 includes the display 12 provided on the main surface of the housing 11. The display 12 displays an image generated by the information processing apparatus 10. In the exemplary embodiment, the display 12 is a liquid crystal display (LCD). However, the display 12 may be any type of display device.

On the main surface of the housing 11, a plurality of operation keys (an operation unit 104 described later) are provided. Specifically, a cross key 13, an A button 14, a B button 15, a first mode switch button 16, and a second mode switch button 17 are provided.

Figure 2:
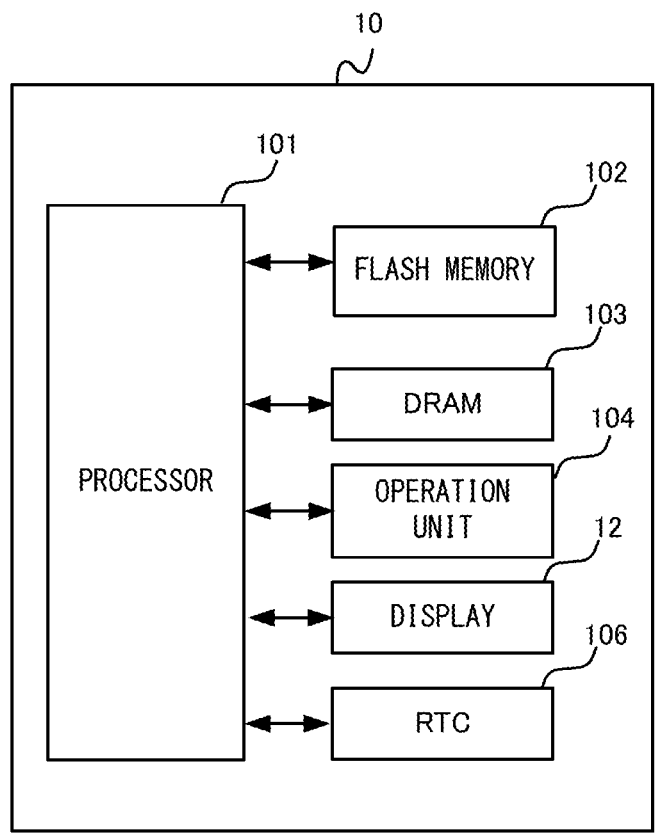
FIG. 2 is a block diagram showing a non-limiting example of the hardware configuration of the information processing apparatus 10.

Next, the hardware configuration of the information processing apparatus 10 will be described. FIG. 2 is a block diagram showing the hardware configuration of the information processing apparatus 10. In FIG. 2, the information processing apparatus 10 includes a processor 101, a flash memory 102, a DRAM 103, an operation unit 104, the display 12, and a real time clock (hereinafter, RTC) 106. The processor 101 executes various processes as described later. As the processor 101, a single processor may be mounted or a plurality of processors may be mounted. The flash memory 102 stores various programs to be executed by the processor 101 and various data to be used on the programs. The DRAM 103 is a memory for storing game data generated through game processing as necessary. In this example, when processing in the exemplary embodiment is actually executed, various programs and data in the flash memory 102 are copied (loaded) onto the DRAM 103. In execution of processing described below, basically, programs and data copied onto the DRAM 103 are used. A part of an area of the DRAM 103 is used also as a VRAM.

Next, the operation unit 104 is an input device for receiving an operation from a user, and corresponds to the plurality of operation keys described above. The RTC 106 provides a clock function and/or a timing function, and the processor 101 can acquire the present time or the like from the RTC 106.

Outline of Processing in the Exemplary Embodiment

Next, the outline of processing assumed in the exemplary embodiment will be described. In the exemplary embodiment, the information processing apparatus 10 has a plurality of operation modes and is configured to be switchable therebetween on the basis of a user's operation. Specifically, the information processing apparatus 10 has at least two operation modes shown below.

First Operation Mode

First, a first operation mode (hereinafter, simply referred to as first mode) is an operation mode in which an emulator program is executed to emulate predetermined game processing that is executed in a predetermined game apparatus. The predetermined game apparatus is a game apparatus other than the information processing apparatus 10, and in the exemplary embodiment, the predetermined game apparatus is assumed to be a game apparatus with an 8-bit CPU, as an example. Hereinafter, the game apparatus is referred to as emulation target game apparatus. Here, the information processing apparatus 10 assumed in the exemplary embodiment is higher in processor performance and image processing performance (processing ability) than the emulation target game apparatus. In addition, the information processing apparatus 10 in the exemplary embodiment is assumed to have a larger number of displayable colors than the emulation target game apparatus. In the following description, the game to be emulated is referred to as emulation target game. The emulation target game is assumed to be a jump action game in which processing is performed on a 2D screen and the screen can be scrolled, as an example. The emulation target game has been originally provided as a game cartridge for the emulation target game apparatus. In the exemplary embodiment, data stored in the game cartridge is stored in the flash memory 102 as game ROM data 404 described later. Then, the game ROM data 404 is read on the emulator program, and the game program included in the game ROM data 404 is executed (emulated), whereby the emulation target game is executed.

Figure 3:
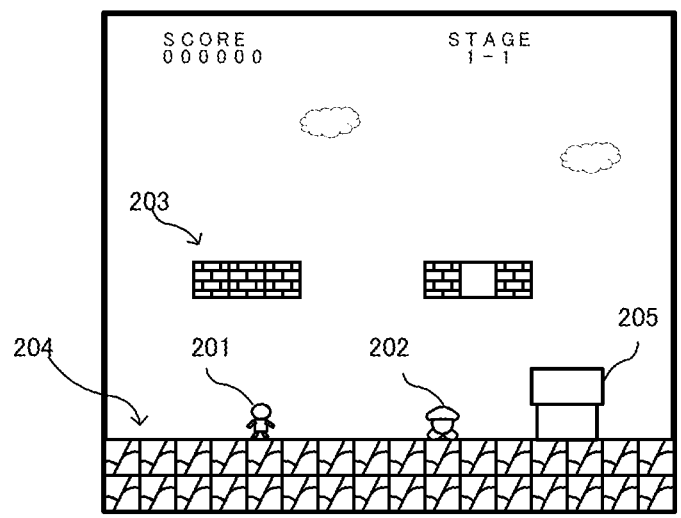
FIG. 3 shows a non-limiting example of a screen in a first mode.

FIG. 3 shows a screen example in the first mode. In FIG. 3, a player character 201, an enemy character 202, a plurality of block characters 203, a pipe 205, and the like are displayed. In FIG. 3, the player character 201 and the enemy character 202 are present on a terrain part 204. The user can operate the cross key 13, the A button 14, and the B button 15 to cause the player character 201 to move or jump. This game is a jump action game in which the player character 201 is operated to avoid various obstacles, stomp on the enemy character 202, or destroy the block character 203, while advancing toward a goal. In the following description, a game screen in the first mode is referred to as "first mode screen".

Second Operation Mode

Figure 4:
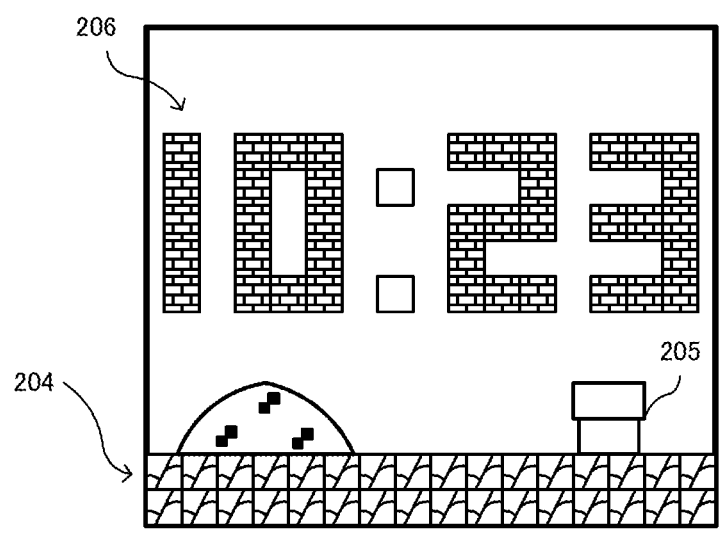
FIG. 4 shows a non-limiting example of a screen in a second mode.

Next, a second operation mode (hereinafter, simply referred to as second mode) will be described. In the exemplary embodiment, as the second mode, a clock application is provided to the user. FIG. 4 shows a screen example in the second mode. In FIG. 4, the present time is displayed in an HH:MM format using the block characters 203. Hereinafter, the plurality of block characters 203 used in such a time display in the second mode are collectively referred to as time blocks 206. Besides, images of the terrain part 204, a mountain, and the pipe 205 are also displayed. The second mode basically causes the information processing apparatus 10 to function as a clock by displaying the present time on the display 12. Hereinafter, a screen in the second mode is referred to as "second mode screen".

Figure 5:
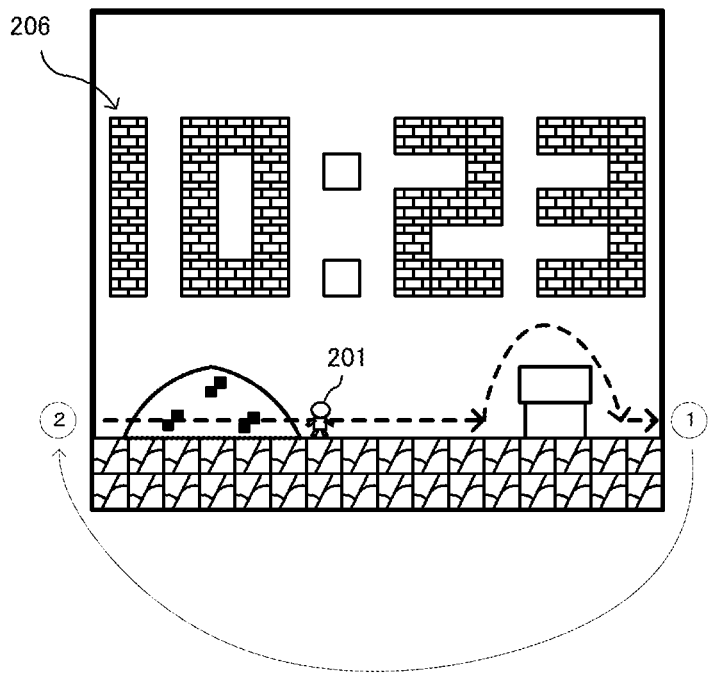
FIG. 5 shows a non-limiting example of a screen in the second mode.

In the exemplary embodiment, the player character 201 and the enemy character 202 appear on the second mode screen, and perform various actions automatically. As an example, FIG. 5 shows another screen example of the second mode screen, and with reference to FIG. 5, a basic action example of the player character 201 on the second mode screen will be described. In FIG. 5, the player character 201 appears (while being on the terrain part 204) from the left end of the screen, and automatically performs an action of running on the terrain part 204 toward the right end of the screen. In addition, the player character 201 performs an action of jumping to avoid the pipe 205 present on the course (a collision detection area is set at the display position of the pipe 205 as described later). Then, when the player character 201 reaches the right end of the screen, the player character 201 moves to outside of the screen. Thereafter, the player character 201 appears from the left end of the screen again to repeat the same operation. In terms of the internal processing, for example, processing is performed such that, when the player character 201 reaches a position of a circled "1" outside the screen, the player character 201 is placed at a position of a circled "2" outside the screen (for example, the processing is performed using an internal screen having a larger area than the display 12). In this way, on the second mode screen, an action in which the player character 201 appears from the left end of the screen and runs toward the right end, is repeatedly performed.

Figure 6:
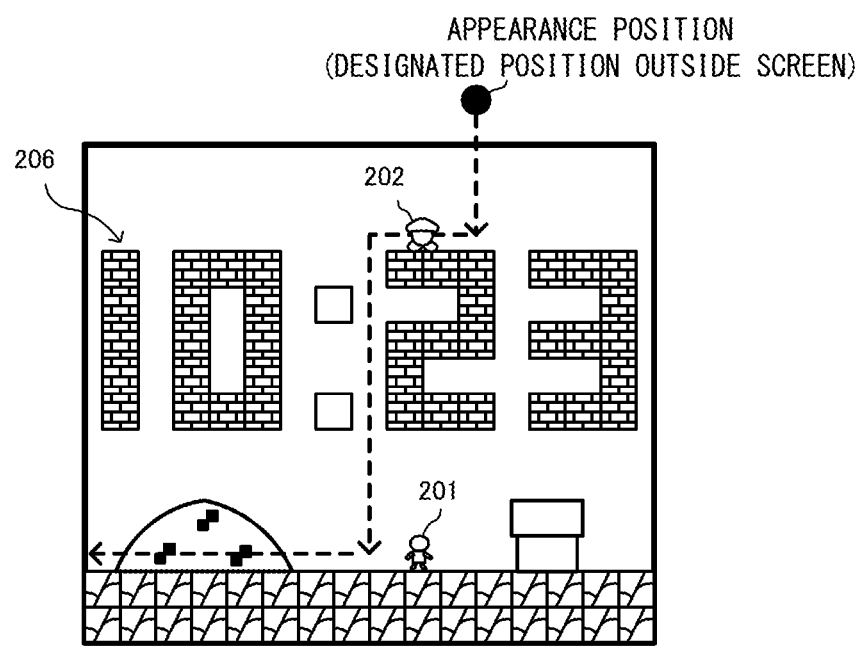
FIG. 6 shows a non-limiting example of a screen in the second mode.

FIG. 6 shows still another screen example of the second mode screen. On this screen, an example in which the enemy character 202 further appears is shown. In this example, the enemy character 202 is controlled so as to appear by falling from the appearance position indicated by a filled circle in FIG. 6 and move toward the left end of the screen. As a result, the enemy character 202 moves through a route as indicated by a dotted line in FIG. 6. First, the enemy character 202 appears so as to land on the time blocks 206, and as the enemy character 202 moves leftward, the platform of the time blocks 206 ends so that the enemy character 202 falls vertically downward. Then, when the enemy character 202 reaches the terrain part 204, the enemy character 202 moves leftward on the terrain part 204. When the enemy character 202 moves to outside of the screen, the enemy character 202 appears from the appearance position indicated by the filled circle in FIG. 6, and the same action control is repeated. In the course of this action, if the player character 201 and the enemy character 202 come close to each other, for example, an action of the player character 201 jumping to avoid the enemy character 202 is also performed.

As described above, in the second mode, while the present time is displayed by the time blocks 206, the player character 201 and the enemy character 202 move automatically. In the exemplary embodiment, a plurality of events that occur in accordance with the time are prepared. In each event, the player character or the like can perform an action different from the basic action exemplified above. For example, at a specific time, the player character 201 can perform a specific action other than the above-described action. In addition, depending on the event content, the background image can change. For example, the color of the background image changes in accordance with the time period such as morning, midday, evening, or night. In addition, depending on the event content, a character (hereinafter, non-appearing character) that does not appear in the original emulation target game can appear. For example, at a specific time, a non-appearing character can appear on the screen. The event contents will be specifically shown later by several examples.

Switching from the second mode to the first mode is performed by pressing the first mode switch button 16. On the other hand, switching from the first mode to the second mode is performed by pressing the second mode switch button 17. Here, when the first mode is switched to the second mode, the game execution state of the emulation target game in the first mode at this point of time is saved. Then, when the second mode is switched to the first mode later, play of the emulation target game can be restarted from the saved state. That is, regarding the first mode, control is performed such that, when an operation of switching to another mode is performed, the game play comes into a paused state, and then, when the mode is switched to the first mode again, the game play is restarted.

In the exemplary embodiment, for convenience in description, the case of having two operation modes is shown. However, three or more operation modes may be prepared. For example, as the third operation mode, still another game processing may be allowed to be executed, and the information processing apparatus 10 may be further provided with an operation unit that enables switching to the third operation mode. Alternatively, switching to the third operation mode may be performed by operating any of the buttons again, and the modes may be switched sequentially.

In the exemplary embodiment, for some of various images to be drawn on the second mode screen, image data included in the game ROM data 404 of the emulation target game are directly used. In the above example, for image data of the player character 201 and the enemy character 202, data included in the game ROM data 404 are directly used. Meanwhile, images other than these characters are displayed by using image data (hereinafter, referred to as additional image data) dedicated for the second mode, which are prepared separately from the game ROM data 404. In addition, for the control of actions of the player character 201 and the enemy character 202 in the second mode, a result of processing by the emulator program is directly used. This point will be described later.

A supplementary explanation will be given on the reason for using such additional background image data. In the exemplary embodiment, the information processing apparatus 10 has a larger number of displayable (available) colors than the number of displayable colors of the emulation target game apparatus. That is, regarding images based on the additional image data, the information processing apparatus 10 can make an expression using a larger number of colors than the emulation target game apparatus. In addition, it is also possible to add an image effect that cannot be provided by the emulation target game apparatus (on the premise that the information processing apparatus 10 itself has such an image processing function). Therefore, on the second mode screen, a richer expression can be made than on the first mode screen. Meanwhile, for the character images, a result of processing of the emulation target game apparatus is directly used. Such a measure is adopted on the basis of a viewpoint such as enhancing reproducibility for actions of characters. That is, the second mode provides the clock application in which the background image can be expressed more richly while the outer appearances and the ways of actions of the player character 201 and the like are reproduced as they are in the original game.

Hereinafter, before processing in the exemplary embodiment is described in more detail, the outline of the image processing in the emulation target game apparatus assumed in the exemplary embodiment will be briefly described.

Outline of Image Processing in Emulation Target Game Apparatus

The emulation target game apparatus assumed in the exemplary embodiment generates a game image using, when roughly classified, a "background image" and a "character image". The background image and the character image both have, as the minimum unit, a pixel pattern composed of 8×8 pixels. Hereinafter, for convenience of description, the pixel pattern composed of 8×8 pixels is referred to as "tile". The tile is data defining the pixel pattern, and besides this, there is also data called "palette" which defines color information to be used for each tile. The number of colors that can be used for each tile is assumed to be four out of fifty-two colors. A plurality of palettes can be defined. In the emulation target game apparatus in this example, four palettes can be defined for the background image, and four palettes can be defined for the character image. A game image is generated by designating the tiles and the palettes to be used for the respective tiles.

Figure 7:
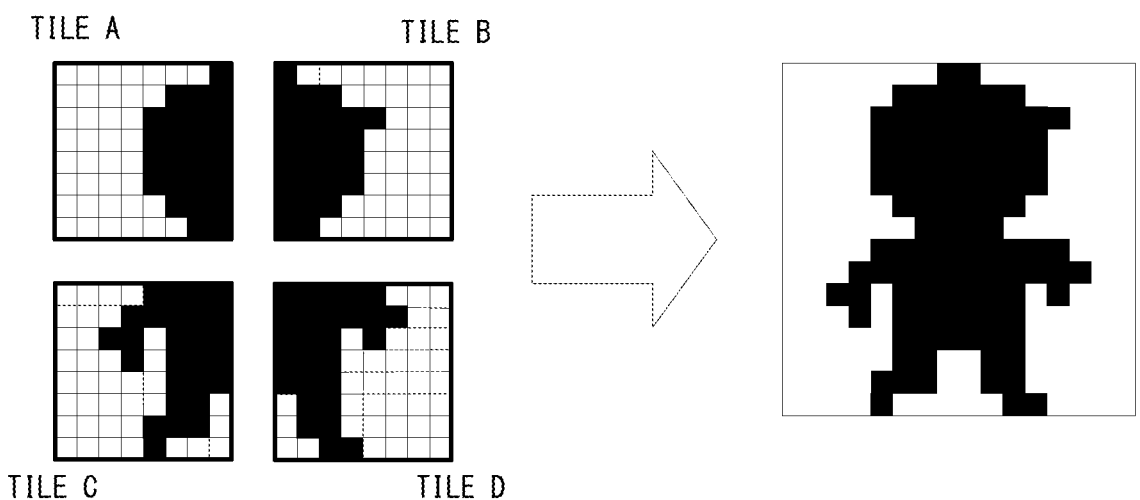
FIG. 7 is a non-limiting example diagram for explaining about image processing.

The background image is expressed by combining a plurality of the tiles. The character image can be expressed by using the tile alone or combining a plurality of the tiles. For example, a player character 201 having a size of 16×16 pixels can be expressed by combining four tiles. FIG. 7 shows an example of the player character image formed by such a combination of four tiles. In the example shown in FIG. 7, four tiles defining the pixel patterns of the upper left part, the upper right part, the lower left part, and the lower right part of the player character 201 are combined in an arrangement of 2×2 to express a character image of one player character 201. In other words, a virtual character that is the player character 201, and the above four tiles, are associated with each other. In the left view in FIG. 7, one square cell corresponds to one pixel. In FIG. 7, pixels in the part where the player character 201 is drawn is expressed in black color (white part is assumed to be transparent color), but in actuality, these pixels are drawn in predetermined colors in accordance with designation of the palettes.

Here, as the "character" described above, a plurality of types of characters including the player character 201, the enemy character 202, and other characters such as the block character 203 (characters for which collision detection with the player character 201 is performed), appear in the emulation target game. In the following description, characters other than the player character 201, such as the enemy character 202 and a character for which collision detection with the player character 201 can be performed, are referred to as "non-player characters (NPC)". In addition, the player character 201 and the NPC are collectively referred to as "appearing characters".

In the game ROM data, the background image data and the appearing character image data are included. As the background image data, 256 tiles at the maximum can be defined. In addition, also for the appearing character image data, data of 256 tiles at the maximum can be defined. In other words, the background image data and the appearing character image data each have data of 256 tiles (at maximum). In the emulation target game apparatus, predetermined tiles included in the background image data are arranged in, for example, 32×30, to generate a background image for one screen. Further, in the emulation target game apparatus, tiles (which are also called sprite) of the appearing character are superimposed at a predetermined position on the background image, thereby generating a game image to be outputted to the display 12. In this way, in the emulation target game apparatus, processing is performed such that the appearing character image is superimposed on the background image formed by arranging tiles, to generate a game image and output the game image.

On the premise that the image processing as described above is performed in the emulation target game apparatus, in the exemplary embodiment, the following processing is performed in each operation mode. First, in the first mode, game processing based on the emulator program is performed as described above. That is, the same image processing as in the emulation target game apparatus is performed, so that a game image outputted as the first mode screen is an image based on the background image data and the appearing character image data included in the game ROM data.

On the other hand, in the second mode, the second mode screen is displayed as described above, in which image data of the player character 201 and the enemy character 202 and action control therefor are obtained by directly using the contents of the game ROM data. Meanwhile, background images such as a sky part and the terrain part 204 are made using the additional image data. It is noted that the time block 206 is treated as an NPC in terms of internal processing, but when displayed on the second mode screen, the time block 206 is displayed using an image based on the additional image data. This is for making a richer expression for the time block 206. In another exemplary embodiment, image data of the block character 203 in the emulation target game may be directly used as the time block 206.

Figure 8:
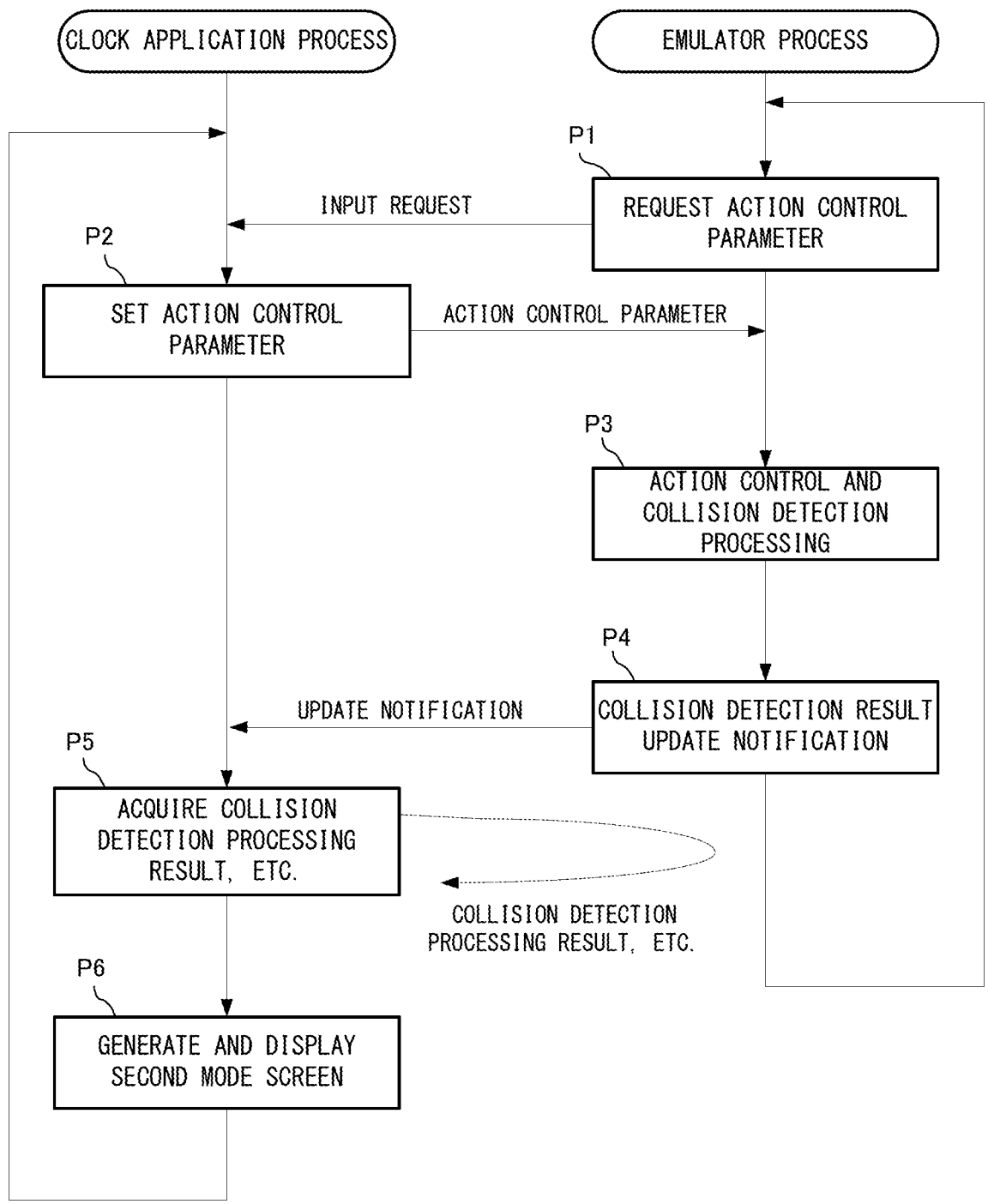
FIG. 8 illustrates a non-limiting example of the outline of second mode processing.

While the details of the second mode processing are described later, here, the outline of the second mode processing will be described with reference to FIG. 8. In the second mode, a process (hereinafter, clock application process) for the clock application and a process (hereinafter, emulator process) based on the emulator program are executed in parallel. The clock application process is a main process for generating the second mode screen, while on the back side (in the background process), the emulator process (i.e., game processing which does not output a screen) is executed simultaneously. As described in detail later, for the game program executed in the emulator process, the game program included in the game ROM data 404 is not directly used, but a game program customized so as to add a function of cooperating with the second mode processing is used.

A typical processing flow will be described. In FIG. 8, first, a request for an action control parameter is issued from the emulator process to the clock application process (P1). In response, an action control parameter is passed from the clock application process to the emulator process (P2: more exactly, the value at a predetermined address in a memory space used in the emulator process is rewritten). The action control parameter includes, for example, operation key data for operating the player character 201 in a pseudo manner, and the like (specific parameter contents will be described later). Next, in the emulator process, actions of the player character 201 and the NPC are controlled on the basis of the action control parameter, and collision detection processing is also performed (P3). In addition, the processing results are stored at a predetermined address in the memory space used in the emulator process. Thereafter, in the emulator process, a notification that the processing result update as described above has occurred is issued to the clock application process (P4). In response, in the clock application process, the processing results of the movement control and the collision detection are acquired (P5). Then, on the basis of the results, the second mode screen is generated and displayed (P6). More specifically, the display positions of the player character 201, the enemy character 202, and the time block 206 are determined on the basis of the above processing results. Further, a background image is generated using the additional image data. Then, a player character image and the like based on the appearing character image data included in the game ROM data are superimposed on the background image. Thus, the second mode screen is generated. Through repetition of the sequential flow as described above, the clock application process in the exemplary embodiment is realized.

Here, supplementary description will be given on the way of treating the time block 206. In the exemplary embodiment, the time block 206 is treated as the NPC for which collision detection can be performed. Therefore, on the emulator process side, the time block 206 is treated as the block character 203 which is originally present in the emulation target game, for example. Then, when the second mode screen is generated on the clock application process side, control is performed such that the image of the block character 203 is replaced with an image based on the additional image data. However, in another exemplary embodiment, for example, if it is not necessary to perform collision detection for the time block 206, the time block 206 may be treated as the background image (as a result, this is drawn on the basis of the additional image data). In the case of desiring to perform collision detection for the time block 206 while treating the time block 206 as the background image, a collision detection position may be set on a part where the time block 206 is placed (e.g., collision detection block arrangement information 486 described later).

As described above, in the exemplary embodiment, in the first mode, the user can play an emulation target game based on the emulator program. On the other hand, in the second mode, another application (in this example, clock application) utilizing the contents of the emulation target game can be provided to the user. The exemplary embodiment can provide an information processing apparatus capable of executing such two operation modes.

Details of Game Processing in the Exemplary Embodiment

Next, with reference to FIG. 9 to FIG. 35, processing by the information processing apparatus 10 in the exemplary embodiment will be described in more detail.

Data in Flash Memory

Figure 9:
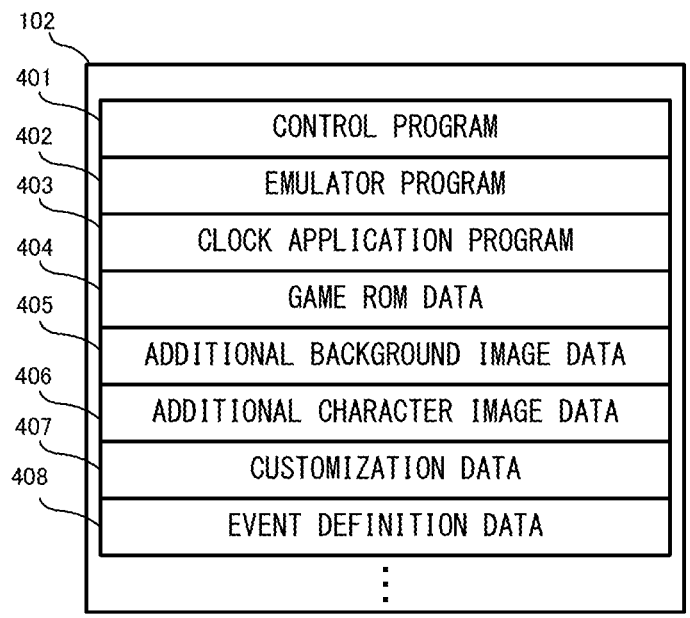
FIG. 9 shows a non-limiting example of data stored in a flash memory 102.

First, various data used in this processing will be described. First, various data stored in the flash memory 102 will be described. FIG. 9 is a memory map showing an example of various data stored in the flash memory 102. The flash memory 102 stores a control program 401, an emulator program 402, a clock application program 403, game ROM data 404, additional background image data 405, additional character image data 406, customization data 407, event definition data 408, and the like.

The control program 401 is a program for controlling basic operation of the information processing apparatus 10. Specifically, the control program 401 is a program for performing switch control between the first mode and the second mode described above, and the like.

The emulator program 402 is a program for emulating operation of the emulation target game apparatus.

The clock application program 403 is a program for implementing operation in the second mode.

Figure 10:
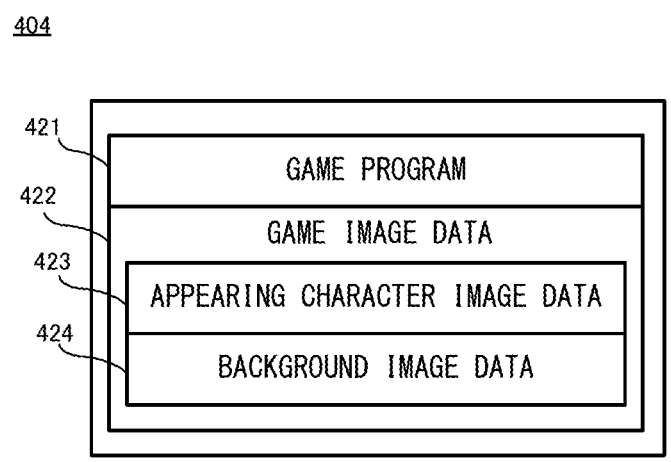
FIG. 10 shows a non-limiting example of the data configuration of game ROM data 404.

The game ROM data 404 is ROM data of the emulation target game. FIG. 10 shows an example of the data configuration of the game ROM data 404. The game ROM data 404 includes a game program 421 and game image data 422. The game program 421 is a program for executing game processing corresponding to the emulation target game. This program runs on the virtual emulation target game apparatus implemented through execution of the emulator program 402.

Figures 11, 12:
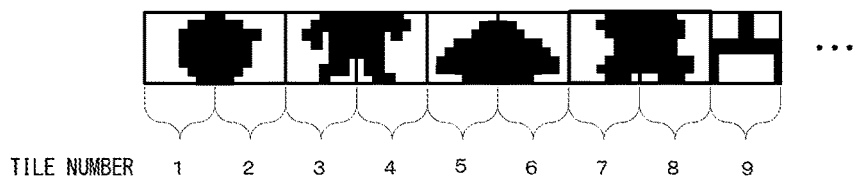
FIG. 11 shows a non-limiting example of the data configuration of appearing character image data 423.
FIG. 12 shows a non-limiting example of data contents of a part of the appearing character image data 423.

The game image data 422 includes various image data used in the emulation target game. As described above, in the emulation target game apparatus, a game image is generated by superimposing an appearing character image on a background image. Therefore, the game image data 422 includes appearing character image data 423 and background image data 424. In the appearing character image data 423, data of images serving as sources of images of appearing characters are stored. FIG. 11 schematically shows the content of the appearing character image data 423. The appearing character image data 423 includes 256 tiles each composed of 8×8 pixels described above. In FIG. 11, a 16×16 table with each tile represented as one square cell is shown. In addition, in FIG. 11, tile numbers are allocated in the respective tiles, for convenience of description. Further, a specific example of contents of the respective tiles is shown in FIG. 12 which shows an example of contents at the tile numbers 1 to 9. In FIG. 12, the tile numbers 1 to 4 represent an image data example for the player character 201. These four tiles are combined to express an image of one player character 201. The tile numbers 5 to 8 represent an image data example for the enemy character 202. Similarly, these four tiles are combined to express an image of one enemy character 202. The tile number 9 represents an image data example for the block character 203. Four of the tiles at the tile number 9 are combined to express one block character 203. As described above, the appearing character image data 423 is image data defining images of the appearing characters (in a unit of tile). It is noted that this data also includes information for designating a palette to be used for each tile, as appropriate.

Returning to FIG. 10, in the background image data 424, data of images serving as sources of background images are stored. The data configuration thereof is the same as that of the appearing character image data 423 and therefore the detailed description thereof is omitted. In the background image data 424, 256 tiles that can be used as background images are defined.

Returning to FIG. 9, the additional background image data 405 and the additional character image data 406 are data corresponding to the additional image data. The additional background image data 405 is data serving as a source of a background image on the second mode screen. The data configuration is basically the same as that of the background image data, and pixel patterns are defined with the tile used as a minimum unit. The additional character image data 406 is data defining images of the non-appearing characters in the second mode. This data further includes data defining images obtained by redrawing some of NPCs appearing in the original emulation target game. A specific example of such data is image data of the time block 206 in the second mode, etc. Also in the additional character image data 406, pixel patterns are defined with the tile used as a minimum unit. In addition, in these data, palette information (information designating colors to be used for respective tiles) as described above is also included, as appropriate.

In the exemplary embodiment, the case where image data of the time block 206 in the second mode is included as the additional character image data 406, is shown. However, in another exemplary embodiment, in the case of treating the time block 206 as a background image, image data of the time block 206 may be included in the additional background image data 405.

Next, the customization data 407 is data used for changing (rewriting) a part of the game program 421 included in the game ROM data 404. Although described in detail later, in the exemplary embodiment, it is necessary to pass data between the execution process of the clock application program and the execution process of the emulator program, in the second mode. Therefore, in the exemplary embodiment, a part of the original game program 421 is changed and thus the game program 421 is customized so as to enable the data to be passed therebetween. The customization data 407 is data defining the details of changing for the game program 421.

The event definition data 408 is data defining events to occur in the second mode. FIG. 13 shows an example of the data configuration of the event definition data 408. The event definition data 408 is a table data having such items as an event number 451, occurrence condition information 452, event content information 453, and action control data 454. The event number 451 is a number for identifying each event. The occurrence condition information 452 is information defining a condition for executing each event. Specifically, in this information, a time (or time period) at which each event is started is defined. Depending on the event content, the present position of the player character 201 may be used as the occurrence condition for the event. For such an event, position information is defined, in addition to time information, or alone. Besides the events associated with a specific time or a specific position as described above, a "basic action" as described above with reference to FIG. 5 and FIG. 6 is treated as "basic event" and the manner of the action control therefor is defined. That is, normally, such a "basic event" is executed, and at a specific time, a specific event corresponding to the time is started to be executed, and after the specific event is finished, the "basic event" is executed again.

The event content information 453 is information defining the contents of events. For example, for an event in which a background image is changed, information designating the changed background is set. For an event in which the player character 201 or a non-appearing character is caused to perform a specific action, information defining the motion thereof is set. For the "basic event" described above, information defining the basic action content and the like for the player character 201 and/or the enemy character 202 as described above is set.

The action control data 454 is information defining data to be passed to the emulator program process. Specifically, the action control data 454 includes information designating the appearance positions of the player character 201 and the enemy character 202 and positions thereof subjected to collision detection, operation key data for inputting an operation for the player character 201 in a pseudo manner, and the like. In the emulator program process, the player character 201 is subjected to action control and collision detection on the basis of this data.

Data in DRAM

Next, data stored in the DRAM 103 will be described with reference to FIG. 14. In the exemplary embodiment, for example, when the information processing apparatus 10 is powered on, processing such as copying the programs and data stored in the flash memory 102 into a predetermined area (address) in the DRAM 103, is performed.

Figure 14:
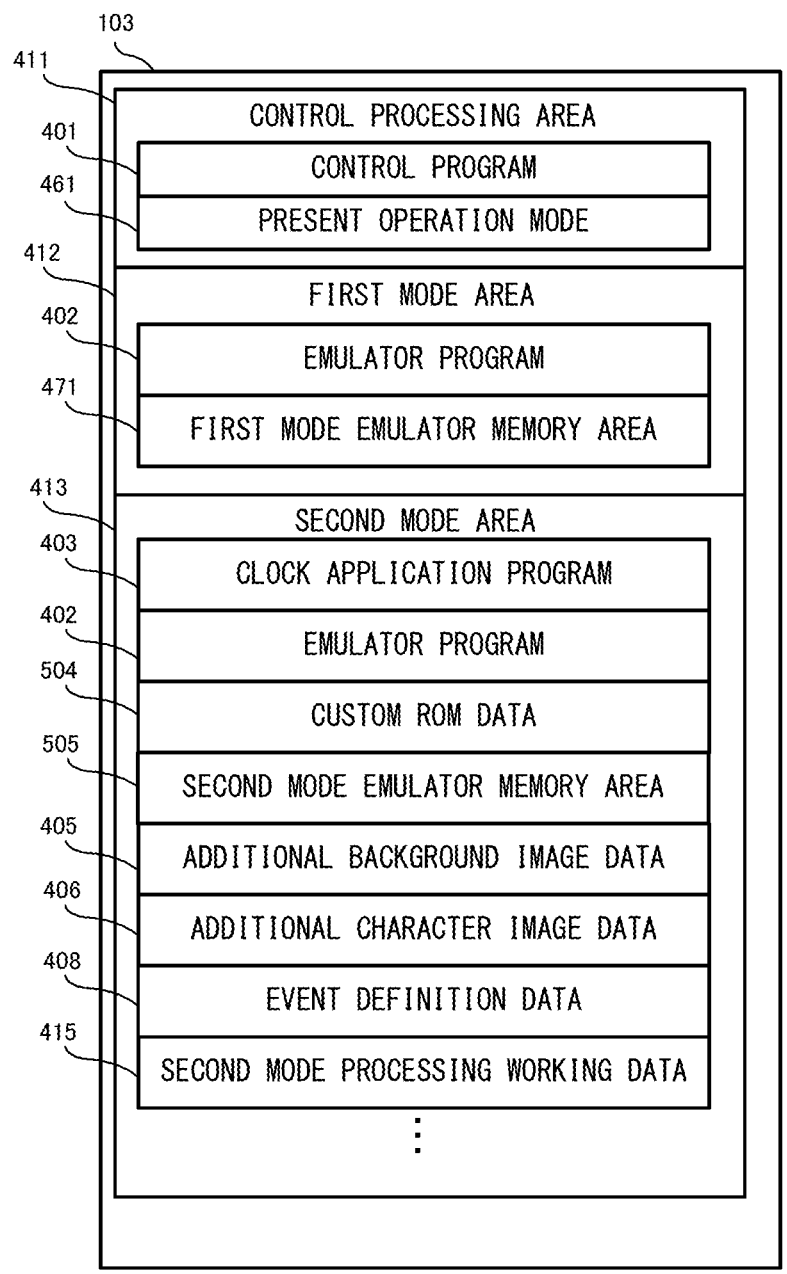
FIG. 14 shows a non-limiting example of data stored in a DRAM 103.

FIG. 14 is a memory map showing an example of various data stored in the DRAM 103. In FIG. 14, the memory space of the DRAM 103 is divided into a control processing area 411, a first mode area 412, and a second mode area 413. First, in the control processing area 411, the control program 401 and a present operation mode 461 are stored. The control program 401 is the one copied from the flash memory 102. The present operation mode 461 is information indicating the present operation mode. In this example, information indicating the first mode or the second mode is set.

Figure 15:
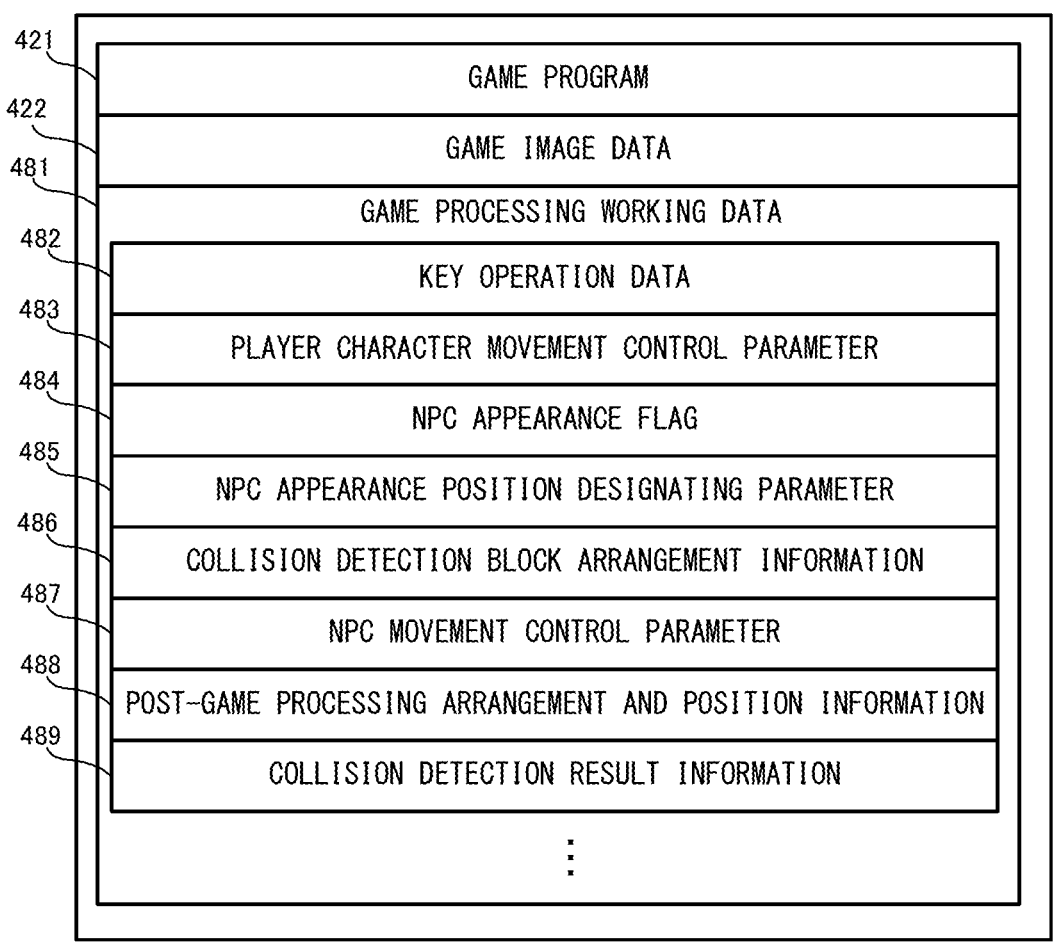
FIG. 15 shows a non-limiting example of data stored in a first mode emulator memory area 471.

In the first mode area 412, the emulator program 402 is stored. In addition, the first mode area 412 includes a first mode emulator memory area 471. This is a memory space corresponding to a memory provided in the emulation target game apparatus (i.e., a memory space that emulates this memory). FIG. 15 shows an example of data stored in the first mode emulator memory area 471. In the first mode emulator memory area 471, a game program 421, game image data 422, and game processing working data 481 are stored. The game program 421 and the game image data 422 are the ones obtained by directly copying contents of the game ROM data 404. More specifically, in the exemplary embodiment, when the emulator program is started to be executed, processing of loading the game ROM data 404 is performed, whereby the game program 421 and the game image data 422 are read into the first mode emulator memory area 471.

The game processing working data 481 is various game data generated through the game processing as appropriate. The game processing working data 481 includes key operation data 482, a player character movement control parameter 483, an NPC appearance flag 484, an NPC appearance position designating parameter 485, collision detection block arrangement information 486, an NPC movement control parameter 487, post-game processing arrangement and position information 488, collision detection result information 489, and the like.

The key operation data 482 is data indicating the input (press) state of each operation key. The player character movement control parameter 483 is a parameter for controlling movement of the player character 201. Specifically, the player character movement control parameter 483 includes parameters designating the movement direction, the movement speed, the acceleration, and the like of the player character 201. The values of these parameters are calculated and determined on the basis of the key operation data 482. In the case where, for example, the game processing is repeated on a 1/60-second basis (in the case of a processing loop on a 1-frame basis), the NPC appearance flag 484 indicates whether or not there is an NPC that newly appears in the processing at the present frame. The NPC appearance position designating parameter 485 is a parameter for designating the appearance position of the NPC that newly appears.

The collision detection block arrangement information 486 is information defining positions to be subjected to collision detection processing with the player character 201 and the enemy character 202 in a virtual game space. Conceptually, a transparent block having a collision detection area is placed in the virtual game space, and this information can be said to be information indicating the placement position thereof. For example, this information is used in the case of setting a collision detection area for a part of the background image. As an example, for the terrain part 204 and the pipe 205 in FIG. 4 which are treated as the background images, position information for collision detection is set as the collision detection block arrangement information 486 so as to be superimposed on these images. Thus, in actuality, collision detection can be performed between the terrain part 204 or the pipe 205, and the player character 201 or the like. In the case where the time blocks 206 are treated as a background image, position information for collision detection may be set for all the positions of the time blocks 206, or position information for collision detection may be set for only certain blocks of the time blocks 206. For example, in the case of desiring to perform collision detection with the enemy character 202 or the like only for the uppermost and lowermost block parts of the time blocks 206, position information for collision detection may be set for only these block positions.

The NPC movement control parameter 487 is a parameter for controlling movement of an NPC (mainly, an enemy character), and includes information such as the movement direction and the movement speed of each NPC.

The post-game processing arrangement and position information 488 is information indicating arrangement and the present positions of the player character 201 and the enemy character 202 that have undergone movement control in the processing at the present frame. That is, this information indicates the positions of the player character 201 and the like in the game space after an input from the user has been reflected. The collision detection result information 489 is information indicating a result of collision detection processing. On the basis of this information, game processing (score increment, character image change designation, etc.) with the collision detection result reflected therein can be further performed.

It can be said that data from the key operation data 482 to NPC movement control parameter 487 have features as "input parameters" relevant to movement control and collision detection processing, and the post-game processing arrangement and position information 488 and the collision detection result information 489 have features as "output parameters" indicating results of the movement control and the collision detection processing.

Although not shown, various other data needed for the game processing are generated as necessary and stored in the first mode emulator memory area 471.

Returning to FIG. 14, next, data stored in the second mode area 413 will be described. In the second mode area 413, the clock application program 403, the emulator program 402, custom ROM data 504, a second mode emulator memory area 505, the additional background image data 405, the additional character image data 406, the event definition data 408, second mode processing working data 415, and the like, are stored. Among these stored data, data other than the custom ROM data 504, the second mode emulator memory area 505, and the second mode processing working data 415 are data obtained by directly copying the respective data stored in the flash memory 102. Therefore, description of such data is omitted.

The custom ROM data 504 is ROM data to be used for the second mode processing. FIG. 16 shows an example of the data configuration of the custom ROM data 504. The custom ROM data 504 includes a custom game program 521 and the game image data 422. The custom game program 521 is a program obtained by partially changing the game program 421 included in the game ROM data 404 so as to adapt to the second mode processing. More specifically, the custom game program 521 is additionally imparted with a function for cooperating with the execution process of the clock application program. This change is made using the customization data 407.

Figure 17:
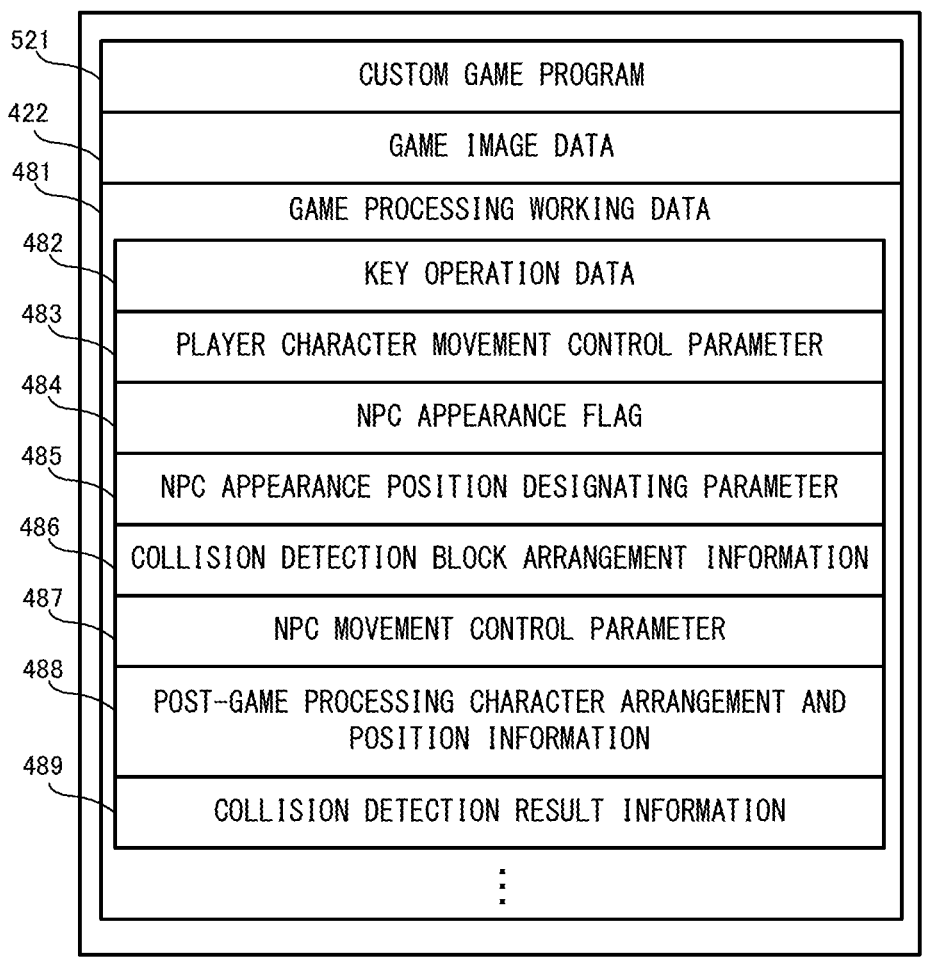
FIG. 17 shows a non-limiting example of data stored in a second mode emulator memory area 505.

Returning to FIG. 14, the second mode emulator memory area 505 is a memory space corresponding to the memory provided in the emulation target game apparatus as in the above description, but is provided for the second mode processing separately from the above-described one. FIG. 17 shows an example of data stored in the second mode emulator memory area 505. In the second mode emulator memory area 505, the custom game program 521, the game image data 422, and the game processing working data 481 are stored. Among these, the game image data 422 and the game processing working data 481 have the same contents as those described above, and therefore description thereof is omitted. The custom game program 521 is the one obtained by reading the custom game program 521 included in the custom ROM data 504 at the time of executing an emulator in the second mode.

Returning to FIG. 14, next, data stored in the second mode processing working data 415 will be described. The second mode processing working data 415 includes various data generated through the second mode processing, as appropriate. FIG. 18 shows an example of the data configuration of the second mode processing working data 415. The second mode processing working data 415 includes operation data 531, present event information 532, action control input parameter 533, additional character association designating information 534, and the like.

The operation data 531 is data indicating the state of an input to each operation key from the user (during the second mode). The present event information 532 is information for specifying an event to be executed at present (event being executed at present). The action control input parameter 533 is data to be passed to the process of the emulator program, in processing described later. Specifically, in the action control input parameter 533, the contents of the key operation data 482, the player character movement control parameter 483, the NPC appearance flag 484, the NPC appearance position designating parameter 485, the collision detection block arrangement information 486, and the NPC movement control parameter 487 described above, are set. On the basis of these data, movement control and collision detection processing for various characters are performed by the emulator program in the second mode.

The additional character association designating information 534 is information set in the case of using the non-appearing character in a predetermined event. In the exemplary embodiment, in the case of using the non-appearing character, emulation is performed by the emulator program with the non-appearing character replaced with an existing character. For example, in the case of using a non-appearing character A, this character is emulated as an existing character B originally included in the emulation target game. Then, the processing result for the existing character B is acquired, the image thereof is replaced with the image of the non-appearing character A, and the replaced image is displayed on the second mode screen. The additional character association designating information 534 is information for temporarily storing such an association between the non-appearing character A and the existing character B.

Details of Processing Executed by Processor 101

Next, with reference to flowcharts shown in FIG. 19 to FIG. 25, the details of the process according to the exemplary embodiment will be described. It is noted that the processing described here is merely shown as an example of general processing, and another processing may be added as appropriate without deviating from the scope of the exemplary embodiment.

Figure 19:
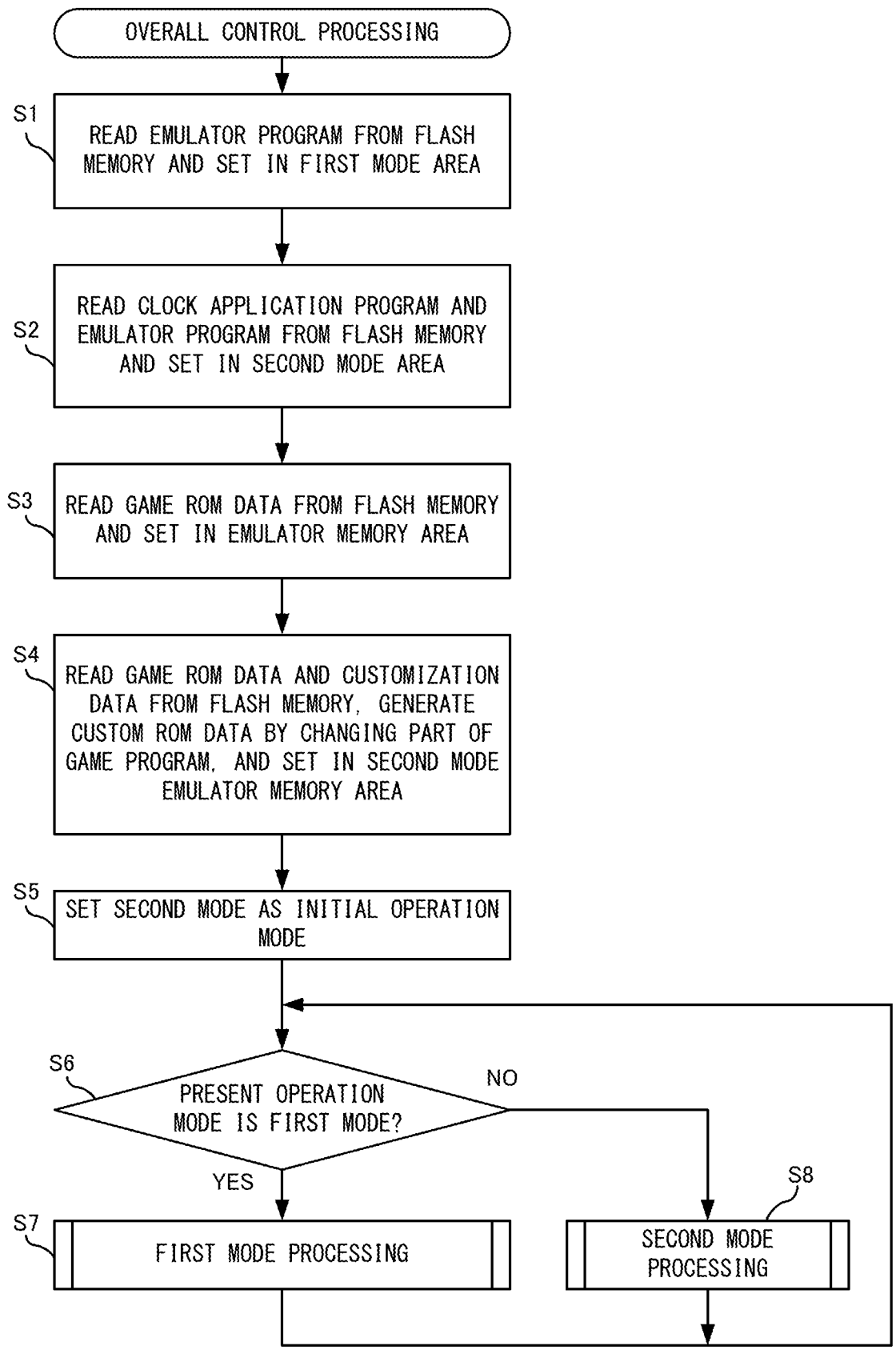
FIG. 19 is a non-limiting example flowchart showing the details of overall control processing.

First, the overall control processing executed by the control program 401 will be described. FIG. 19 is a flowchart showing the details of the overall control processing. When the information processing apparatus 10 is powered on, this processing is automatically started (with the control program 401 copied from the flash memory 102 into the DRAM 103), and is repeatedly executed until the power is turned off.

In FIG. 19, first, in step S1, the processor 101 reads the emulator program 402 from the flash memory 102 and sets the read program in the first mode area 412. In the subsequent step S2, the processor 101 reads the clock application program 403 and the emulator program 402 from the flash memory 102, and sets the read programs in the second mode area 413.

Next, in step S3, the processor 101 reads the game ROM data 404 from the flash memory 102 and sets the read data in the first mode emulator memory area 471. This is performed by causing the emulator program 402 set in the first mode area 412 to execute processing of loading the game ROM data 404, for example.

Next, in step S4, the processor 101 reads the game ROM data 404 and the customization data 407 from the flash memory 102. Further, the processor 101 changes a part of the game program 421 included in the read game ROM data 404, on the basis of the customization data 407, to generate the custom ROM data 504 including the custom game program 521. Then, the processor 101 stores the custom ROM data 504 into the second mode area 413.

Next, in step S5, the processor 101 sets the "second mode" to the present operation mode 461, as an initial operation mode.

Next, in step S6, the processor 101 determines whether or not the operation mode at present is the first mode. As a result of the determination, in the case of the first mode (YES in step S6), in step S7, the processor 101 executes first mode processing. On the other hand, in the case of the second mode (NO in step S6), in step S8, the processor 101 executes second mode processing. Then, the processing returns to step S6, to repeat the processing.

Although not shown, in the overall control processing, besides the above control, for example, control for shifting to a so-called sleep mode, or the like, is also executed as appropriate. That is, processing such as turning off the screen output after no operation has been performed for a certain period or longer, is also executed as appropriate. At this time, control for pausing the first mode processing or the second mode processing that is being executed, may be performed.

First Mode Processing

Figure 20:
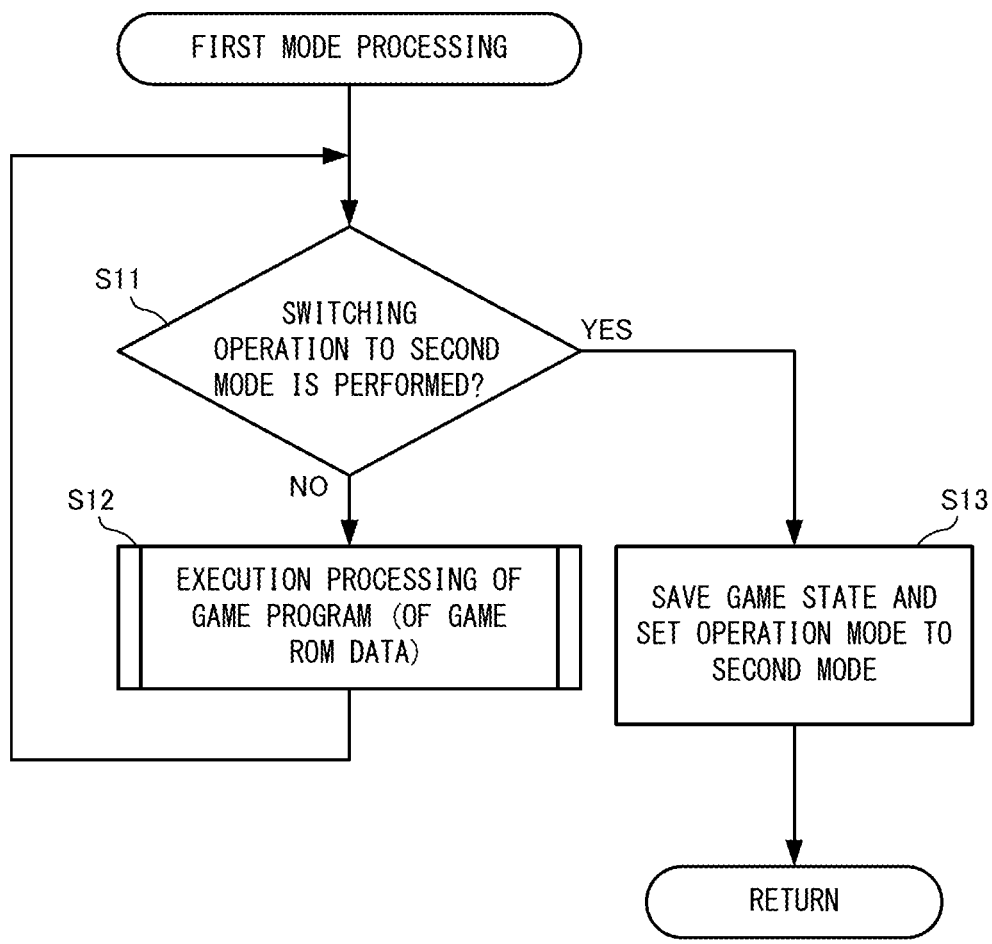
FIG. 20 is a non-limiting example flowchart showing the details of first mode processing.

Next, the details of the first mode processing will be described. FIG. 20 is a flowchart showing the details of the first mode processing. In FIG. 20, first, in step S11, the processor 101 determines whether or not a switching operation to the second mode has been performed. That is, whether or not the second mode switch button 17 is pressed is determined. As a result, if the switching operation has not been performed (NO in step S11), in step S12, the processor 101 performs game program execution processing and returns to step S11. It is noted that the processing loop in steps S11 and S12 is repeatedly executed per one frame, for example. On the other hand, if the switching operation has been performed (YES in step S11), in step S13, the processor 101 sets the "second mode" to the present operation mode 461, and ends the first mode processing. At this time, the processor 101 saves the game state so that, when the mode next shifts to the first mode, the game play can be restarted from the state at the last interruption. Specifically, control is performed so that the second mode processing is started with the state of the first mode emulator memory area 471 kept as it was. Thus, when the second mode is next switched to the first mode, it is possible to restart from the state at the interruption. Regarding this processing, in another exemplary embodiment, when a switching operation from the first mode to the second mode is performed, for example, game state saving data in which the state of the first mode emulator memory area 471 at that time is saved may be separately generated and stored. Then, this data may be read when the first mode is restarted.

Figure 21:
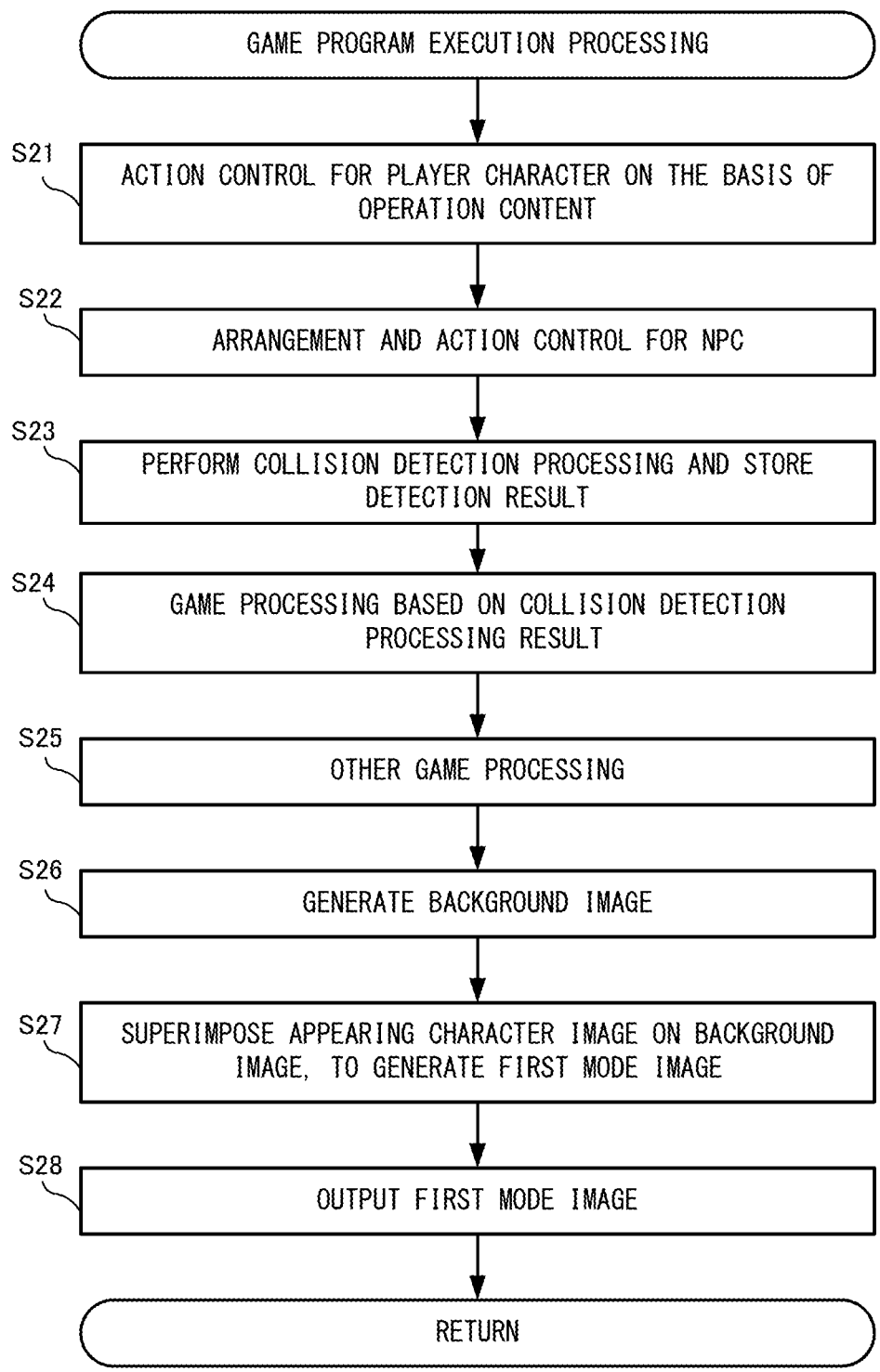
FIG. 21 is a non-limiting example flowchart showing the details of game program execution processing.

Next, the details of the game program execution processing in step S12 will be described. In this processing, the game processing of the emulation target game is emulated through execution of the emulator program. Therefore, conceptually, it can be also said that the main unit for this processing is an emulator. FIG. 21 is a flowchart showing the details of this processing. In FIG. 21, first, in step S21, the processor 101 causes the emulator to perform action control for the player character 201 on the basis of a user's operation, i.e., the key operation data 482.

Next, in step S22, the processor 101 causes the emulator to perform arrangement and action control for various NPCs. In the subsequent step S23, the processor 101 causes the emulator to execute collision detection processing as appropriate and store the result thereof into the collision detection result information 489.

Next, in step S24, the processor 101 causes the emulator to execute various types of game processing based on the collision detection result information 489. Further, in step S25, the processor 101 causes the emulator to execute other various types of game processing.

Next, in step S26, the processor 101 causes the emulator to generate a background image using the background image data 424 such that the results of the above game processing are reflected therein. Further, in step S27, images of various appearing characters are generated using the appearing character image data 423. Then, the images of the appearing characters are superimposed on the background image, whereby a game image (hereinafter, referred to as first mode image) to be displayed as the first mode screen is generated.

Next, in step S28, the processor 101 causes the emulator to perform processing of outputting the first mode image to the display 12. Thus, the game program execution processing has been finished.

Second Mode Processing

Next, the details of the second mode processing in step S8 will be described. As described above, in the second mode, the clock application process by execution of the clock application program and the emulator process by execution of the second mode emulator processing are performed in parallel (see FIG. 8). Here, processing on the clock application process side will be described first, and then processing on the emulator process side will be described.

Figure 22:
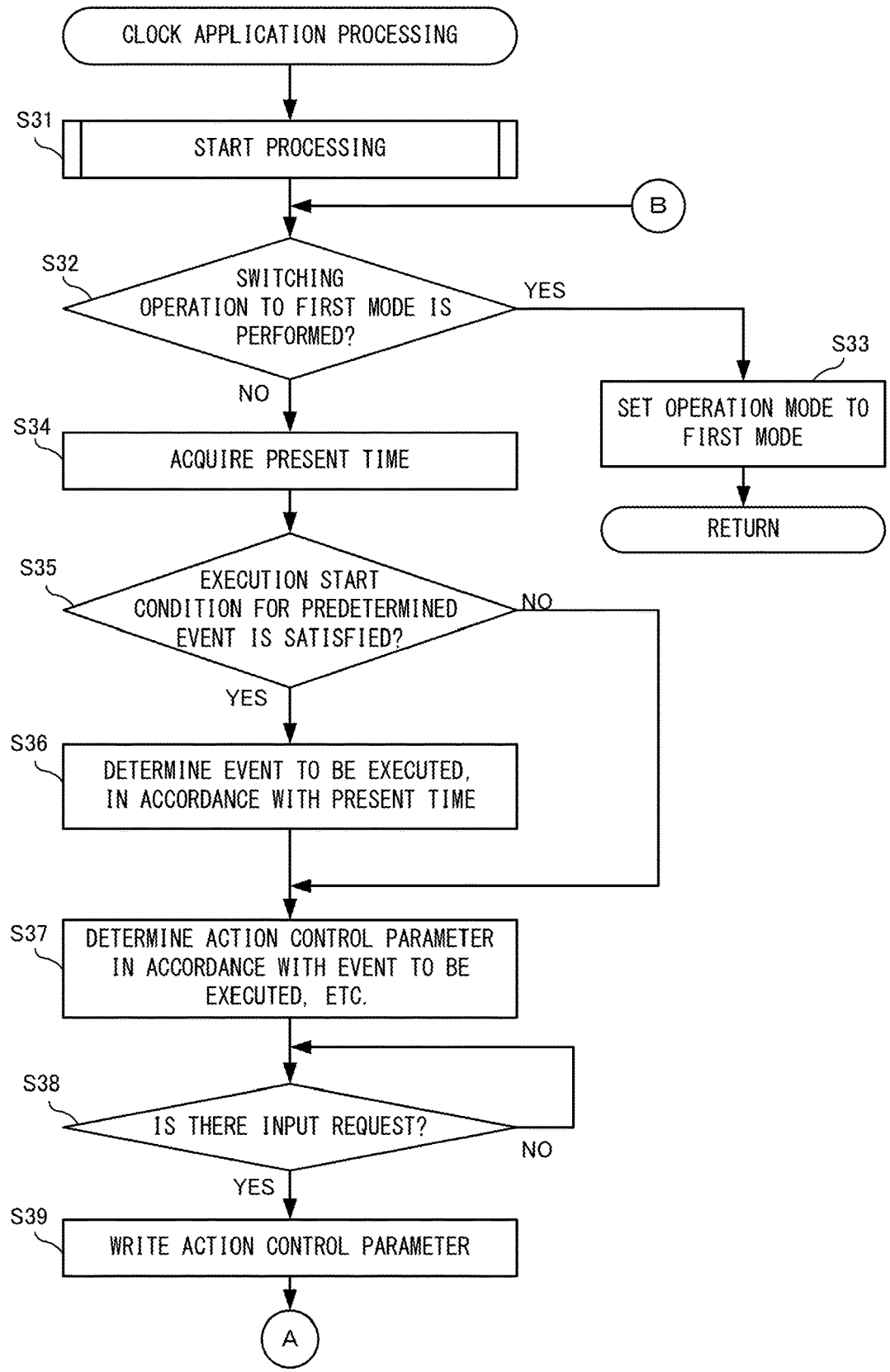
FIG. 22 is a non-limiting example flowchart showing the details of clock application processing.
Figure 23:
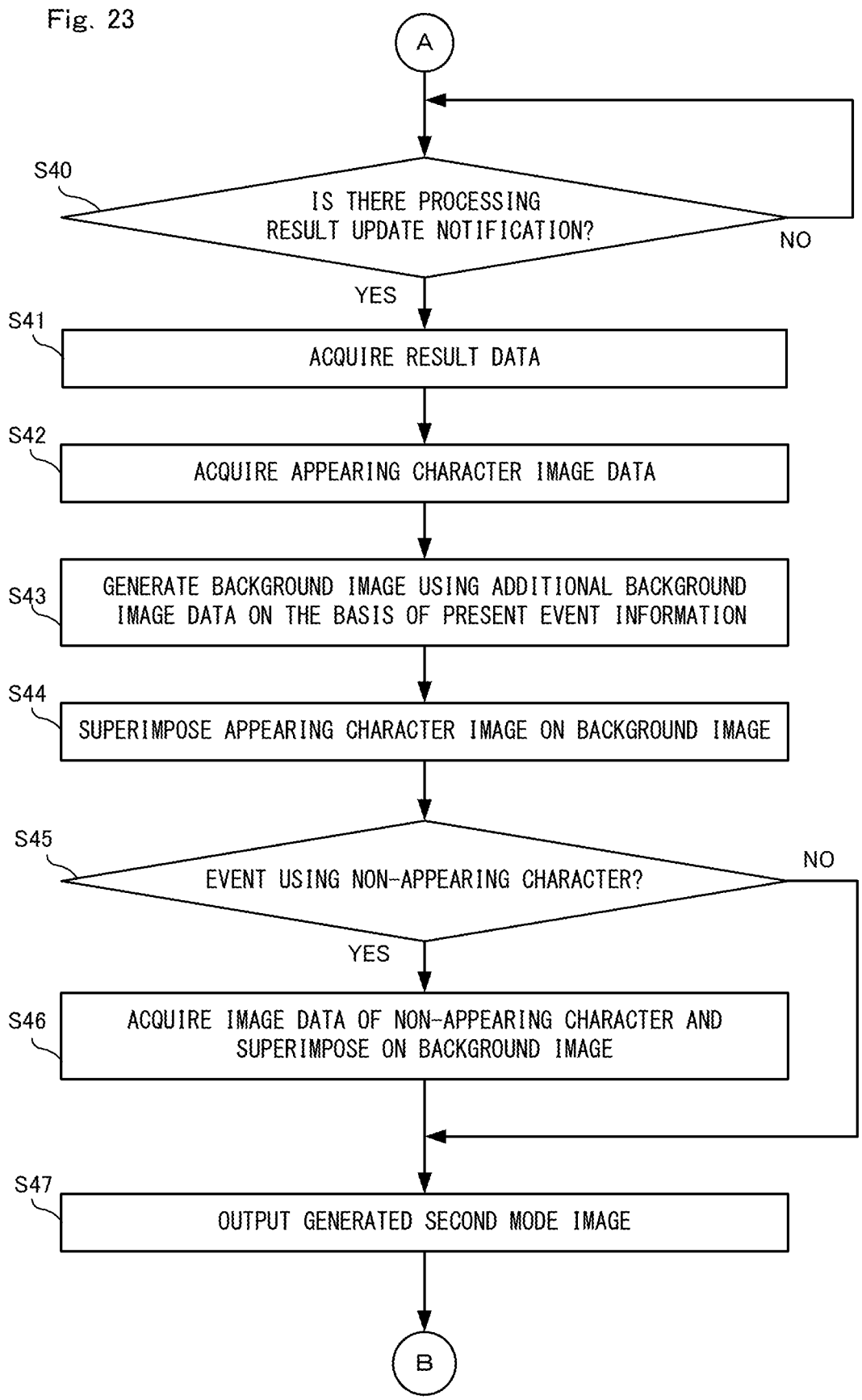
FIG. 23 is a non-limiting example flowchart showing the details of the clock application processing.

FIG. 22 and FIG. 23 are flowcharts showing the details of clock application processing which is processing on the clock application process side. In FIG. 22, first, the start processing is executed in step S31. In this process, preparation and initial settings for executing the second mode processing are performed.

Figure 24:
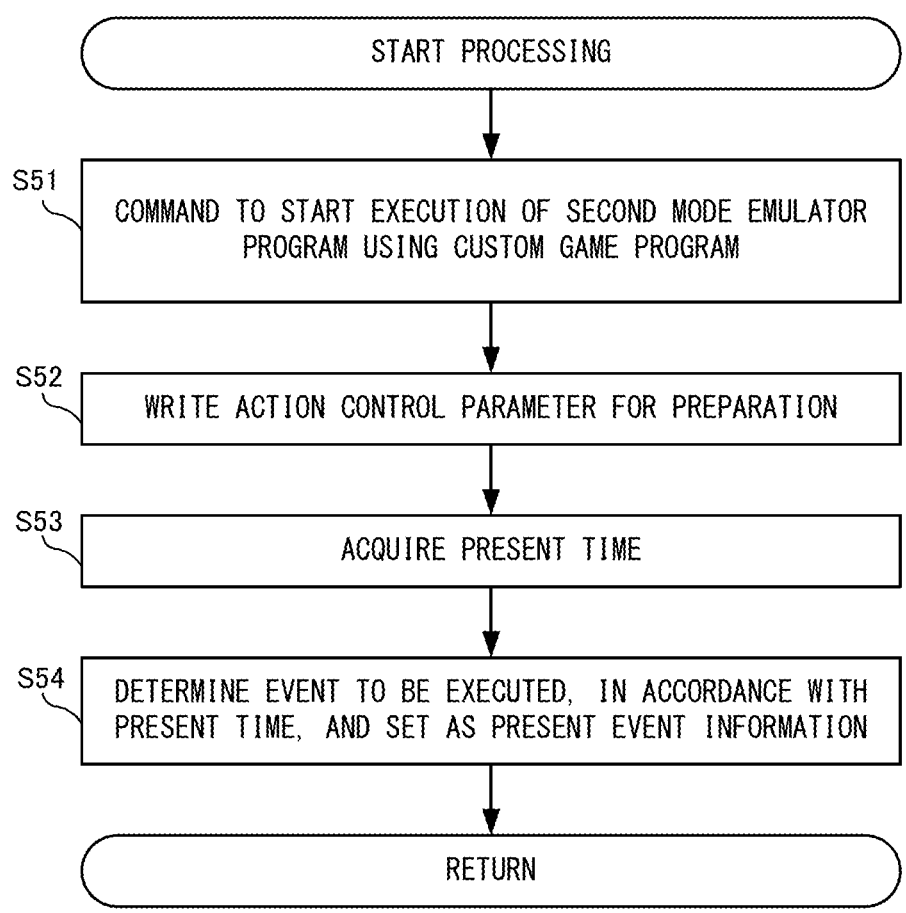
FIG. 24 is a non-limiting example flowchart showing the details of start processing.

FIG. 24 is a flowchart showing the details of the start processing. First, in step S51, the processor 101 initializes the second mode emulator memory area 505, and commands the second mode emulator to start execution of emulation processing using the custom game program 521 (as a result, second mode emulator processing described later is started).

Next, in step S52, the processor 101 executes processing of generating the key operation data 482 for initial preparation and passing the generated key operation data 482 to the second mode emulator. The key operation data 482 here indicates the content of an operation on a title screen of the emulation target game, for example. In this example, a key operation for starting the game on the title screen is passed to the second mode emulator. More specifically, processing of sequentially writing the contents of operations as described above into the key operation data 482 in the second mode emulator memory area 505, is executed. Thus, on the emulator process side, after the emulation target game is started, the game processing is progressed to the point at which the first stage is started, and a further input is awaited.

Next, in step S53, the processor 101 acquires the present time from the RTC 106. Next, in step S54, the processor 101 determines the content of an event that is to be executed, on the basis of the present time and the event definition data 408. Then, the event number 451 indicating the event is set in the present event information 532. Thus, the start processing is finished.

In another exemplary embodiment, next to the processing in step S54, processing of generating a second mode screen in which the time blocks 206 are arranged so as to show the present time, and displaying the second mode screen once at this point of time, may be performed.

Returning to FIG. 22, next, in step S32, the processor 101 determines whether or not a switching operation to the first mode has been performed, on the basis of the operation data 531. That is, whether or not the first mode switch button 16 has been pressed is determined. As a result, if the switching operation has been performed (YES in step S32), in step S33, the processor 101 sets the "first mode" to the present operation mode 461, and ends the clock application process.

On the other hand, if the switching operation has not been performed (NO in step S32), in step S34, the processor 101 acquires the present time from the RTC 106. Next, in step S35, the processor 101 determines whether or not a condition for starting execution of a predetermined event is satisfied, on the basis of the present time and the event definition data 408. As a result of the determination, if the condition for starting execution of the predetermined event has been satisfied (YES in step S35), in step S36, the processor 101 determines the content of an event that corresponds to the present time and that is to be executed, on the basis of the event definition data 408. Depending on the event content, further, the event to be executed may be determined in accordance with the position of the player character 201. Then, the event number 451 corresponding to the determined event content is set in the present event information 532. It is noted that, in the case where a predetermined event started at a specific time is finished, it is determined that a condition for starting the "basic event" is satisfied, and thus the "basic event" is determined to be executed.

On the other hand, if it is determined in step S35 that the condition for starting the predetermined event is not satisfied (NO in step S35), the processing in step S36 is skipped.

Next, in step S37, the processor 101 executes processing of preparing the action control parameter to be passed to the emulator process, in accordance with the content of the event to be executed. Specifically, on the basis of the content of the event to be executed, the present position of the player character 201, and the like, the processor 101 determines the contents of the key operation data 482, the player character movement control parameter 483, the NPC appearance flag 484, the NPC appearance position designating parameter 485, the collision detection block arrangement information 486, and the NPC movement control parameter 487 described above. For example, the processor 101 performs determination as to the positional relationship between the player character 201 and the enemy character 202 (regarding the processing result at the last frame). Then, if the enemy character 202 is present at a position in the moving direction of the player character 201, the content of the key operation data 482 is determined so as to cause the player character 201 to jump. If an enemy character 202 is newly caused to appear, the processor 101 turns on the NPC appearance flag 484, and determines the content of the NPC appearance position designating parameter 485 so as to designate the appearance position or the display position of each NPC including the time block 206. In the case of causing the player character 201 or the like to perform a specific action in accordance with a specific event, the contents of the key operation data 482 and the player character movement control parameter 483 are determined on the basis of the action content.

Here, regarding an event in which a non-appearing character that does not appear in the emulation target game is used as described above, a supplementary explanation will be given. In such an event, processing using an existing character as a substitute for the non-appearing character is performed on the emulator process side as described above. Therefore, in this case, as the additional character association designating information 534, information indicating association between the non-appearing character to be used on the clock application side and the NPC to be treated as a substitute character on the emulator process side, is generated. Then, the NPC appearance flag 484, the NPC appearance position designating parameter 485, and the NPC movement control parameter 487 regarding the substitute NPC are determined.

Next, in step S38, the processor 101 determines whether or not a request for an input of "action control parameters" has come from the emulator process. If the input request has not come yet (NO in step S38), the processor 101 waits until the input request comes. If the input request has come (YES in step S38), in step S39, the processor 101 writes the parameters for action control determined in step S37, into the second mode emulator memory area 505. That is, processing of changing the contents of the game processing working data 481 (i.e., data to be used in the emulator processing) in the second mode emulator memory area 505, is performed.

Next, in step S40 in FIG. 23, the processor 101 determines whether or not a "notification of processing result update" has come from the emulator process. If the "notification of processing result update" has not come yet (NO in step S40), the processor 101 waits until the "notification of processing result update" comes. If the notification has come (YES in step S40), next, in step S41, the processor 101 acquires data of the processing result of the emulator process. That is, the processor 101 acquires the post-game processing arrangement and position information 488 and the collision detection result information 489 from the second mode emulator memory area 505.

Next, in step S42, the processor 101 acquires necessary image data of appearing characters from the character image data in the second mode emulator memory area 505, on the basis of the processing result data.

Next, in step S43, the processor 101 generates a background image using the additional background image data 405, on the basis of the present time, the processing result data, and the event content indicated by the present event information 532. In addition, on the basis of the event content indicated by the present event information 532, a background image to be used is determined and the color thereof is set. For example, an image of the terrain part 204 described above is made different between a time A and a time B, or the color of the sky part is changed in accordance with a time period. As described above, since there are a larger number of used colors in the additional background image data 405, the background image can be expressed more richly than in the emulation target game.

Next, in step S44, the processor 101 specifies the display positions of the appearing characters on the basis of the processing result data. That is, the display positions of the player character 201, the enemy character 202, the time block 206, and the like are specified. Then, the processor 101 superimposes the above acquired images of the appearing characters at the corresponding positions on the background image. Here, for the time block 206, the image data included in the additional character image data 406 is used to be superimposed on the background image. Therefore, for the time block 206, control is performed such that the image data of the character (block character 203) that appears in the original emulation target game is replaced with the corresponding one in the additional character image data 406.

Next, in step S45, the processor 101 determines whether or not the event that is being executed at present is an event using the non-appearing character. As a result, if the event uses the non-appearing character (YES in step S45), in step S46, the processor 101 refers to the additional character association designating information 534 and specifies data of the non-appearing character to be acquired. Further, the processor 101 acquires image data of the non-appearing character from the additional character image data 406. Then, the processor 101 specifies the display position of the substitute NPC on the basis of the processing result data, and superimposes the image of the non-appearing character at the specified position on the background image. Thus, the substitute NPC having been subjected to the emulator process can be displayed in a state of being replaced with the non-appearing character. On the other hand, as a result of the determination, if the event does not use the non-appearing character (NO in step S45), the processing in step S46 is skipped.

Next, in step S47, the processor 101 displays a second mode image in which the images of the appearing characters and/or the non-appearing characters are superimposed on the background image as described above, on the display 12. Thereafter, the processor 101 returns to step S32 to repeat the processing.

Emulator Processing in Second Mode

Figure 25:
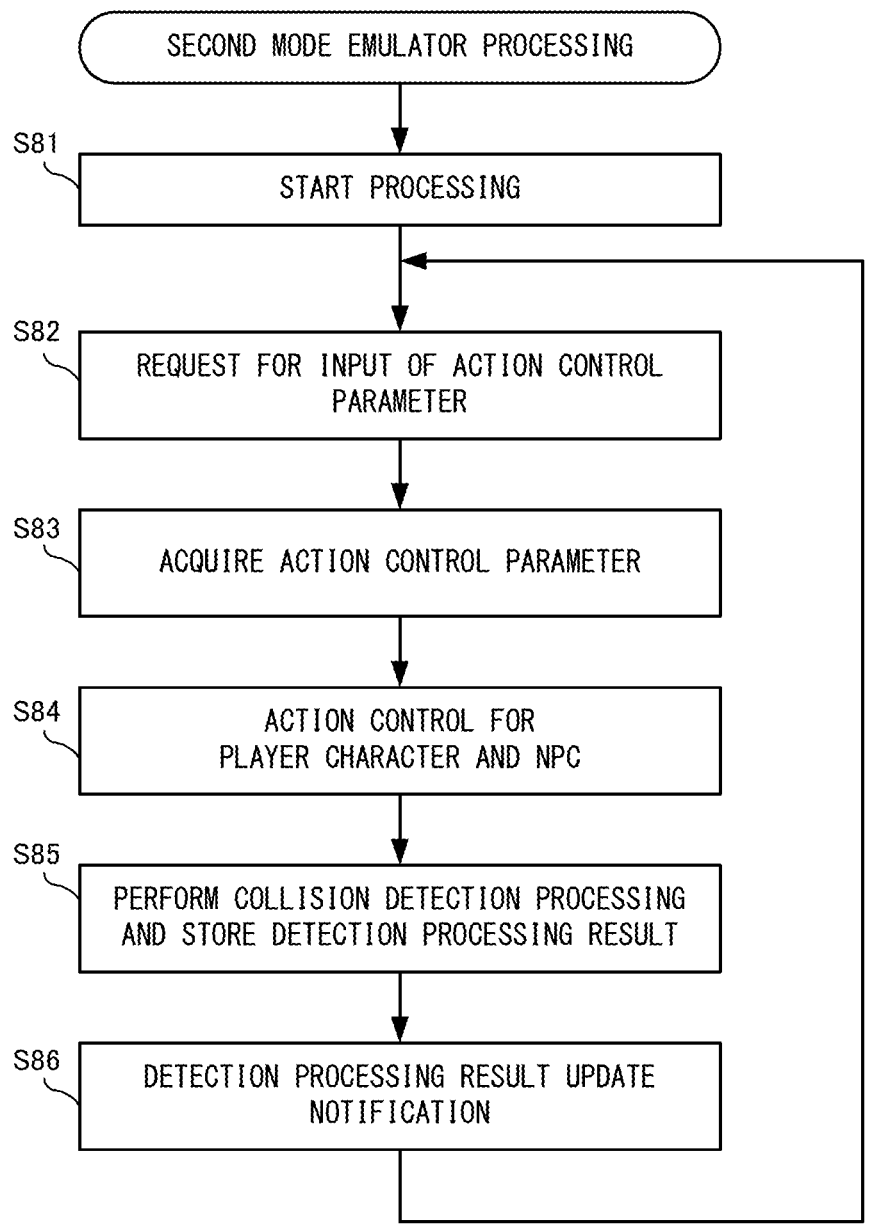
FIG. 25 is a non-limiting example flowchart showing the details of second mode emulator processing.

Next, processing on the emulator process side in the second mode (hereinafter, second mode emulator processing) will be described. FIG. 25 is a flowchart showing the details of the second mode emulator processing. When the execution start command is issued from the clock application process side in step S51 in FIG. 24, the second mode emulator processing is started to be executed as a separate process. As in the case of the first mode, conceptually, the main unit for this processing is an emulator.

First, in step S81, the processor 101 causes the emulator to execute start processing. This processing is processing for preparing for cooperation with the clock application process. Specifically the following processing is executed. First, the emulator loads the custom ROM data 504 and starts to execute game processing based on the custom game program 521. As a result, a title screen of the game is internally displayed, for example. The emulator performs game processing based on the action control parameter for the preparation (pseudo input operation) sent from the clock application process side. The action control parameter for the preparation includes operation key data for progressing the game processing to the point at which the first stage is started after the emulation target game is started. Therefore, through the start processing, the game processing is automatically progressed to the point at which the first stage is started, using the pseudo input operation on the emulator process side.

Next, in step S82, the processor 101 causes the emulator to issue a request for inputting the action control parameter, to the clock application process side. In response, processing of writing the action control parameter is performed on the clock application process side (step S39 described above).

Next, in step S83, the processor 101 causes the emulator to acquire the written action control parameter. Further, in the subsequent step S84, the processor 101 causes the emulator to perform arrangement and action control for the player character 201 and the various NPCs on the basis of the action control parameter. As described above, the action control parameter includes the pseudo operation on the player character 201, the arrangement positions of collision detection blocks corresponding to the arrangement of the time blocks 206, the appearance position of the enemy character (including the one associated with a non-appearing character), and the like. That is, the action control parameter indicates the position and arrangement information about characters corresponding to the content to be displayed as the second mode screen. Therefore, the action control performed here substantially corresponds to processing of causing the player character 201 and/or the enemy character 202 to perform actions in a screen layout (virtual game space) on the second mode screen. Then, the result of the action control processing is stored as the post-game processing arrangement and position information 488 in the second mode emulator memory area 505.

Further, in step S85, the processor 101 causes the emulator to perform collision detection processing on the basis of the above action control. Collision detection between the player character 201 and the enemy character 202, and collision detection between the time block 206 and the player character 201/the enemy character 202, are performed. The result thereof is stored as the collision detection result information 489 in the second mode emulator memory area 505.

Next, in step S86, the processor 101 causes the emulator to issue a notification that the collision detection processing result is updated, to the clock application process side. In response, the subsequent processing from step S41 described above is to be performed on the clock application process side. Although not shown, on the emulator process side, game processing such as game screen generation processing (corresponding to steps S24 to S28 in FIG. 21 described above) is also subsequently performed internally, but the actual screen output is not performed. Thus, after game processing for one frame is performed internally, the processor 101 returns to step S82 to repeat the processing.

As described above, the main role of the emulator in the second mode is to execute action control and collision detection processing for various characters on the basis of the action control parameter inputted from the clock application process side. Using the result of the above processing, generation of the second mode screen as described above is to be performed on the clock application process.

Processing Application Examples

Next, several application examples of the above second mode processing will be described with reference to screen examples as necessary.

Examples in Which Terrain/Background is Changed

Figure 26:
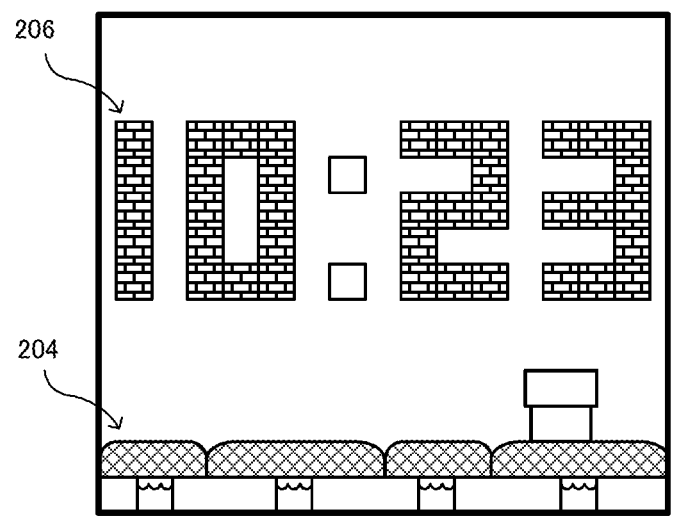
FIG. 26 shows a non-limiting example of a screen in the second mode.

A first application example is an example in which an image of the terrain on the second mode screen is changed. FIG. 26 shows an example in which the image of the terrain part 204 is changed. As compared to the second mode screen shown in FIG. 4 above, the image of the terrain part 204 is changed from the block-shaped terrain to a terrain similar to mushrooms. This change may be performed at the following timing, for example. One example of the change timing is when the operation mode is switched (timing of switching from the first mode to the second mode). Besides, in the second mode, the terrain image used on the second mode screen may be randomly changed to another terrain image at a timing of returning from a sleep mode.

The color of the background on the second mode screen, specifically, the "sky" part, may be changed in accordance with a time period. That is, the color of the "sky" may be changed in accordance with a time period such as morning, midday, evening, night, or late at night. Since the number of used colors is larger in the additional background image data 405, color expression for the "sky" that changes on a time period basis as described above can be made more richly than in the emulation target game.

Besides, the image of the time block 206 may be changed in accordance with a time, e.g., the image of the time block 206 may be changed into a coin image at a specific time. It is noted that this coin image data is image data originally included in the emulation target game. At this time, the player character 201 may be caused to perform an action of taking the coin. Control for this taking action can be performed by directly using a processing result of the emulator.

As the image data for drawing the time block 206, the additional image data therefor may be prepared and used, or the (original) image data included in the emulation target game may be directly used.

Example in Which Player Character is Changed

As another application example, processing of changing the player character 201 to an image of another player character may be performed randomly or in a specific time period. For example, in the case where the emulation target game is a game that can be played by two or more players simultaneously, the player character may be changed to an image of a character to be operated by the second or subsequent player (including not only a character having an obviously different outer appearance but also a character merely of a "different color version"). Also in this case, image data in the emulation target game can be directly used as image data of such a changed character.

Examples Using User Input

As another application example, processing using an input from the user as a trigger for changing the background image as described above may be performed. For example, in the second mode, processing of changing the color of the time block 206 to another color may be performed every time the player presses the A button 14 and the B button 15 at the same time. For example, between step S44 and step S45 in FIG. 23, processing may be performed so as to determine whether or not such simultaneous pressing has been performed, and change the display color setting for the time block 206 if the simultaneous pressing has been performed. In addition, by using such a configuration that the additional image data is to be used for the image of the time block 206, it becomes possible to make a wider variety of color expressions.

Examples of Temporarily Changing Player Character Image

As another application example, processing of causing the player character 201 to perform an action that is not present in the original emulation target game may be performed. For example, processing may be performed such that, when the player character 201 comes to a predetermined position, the player character 201 is stopped once, the image of the player character 201 is temporarily changed to an image that is not present in the original emulation target game, and then the player character 201 is returned to its original image and restarts to move. More specifically, the player character 201 may be sometimes stopped at predetermined positions, and the player character 201 may be drawn by a "front image" or a "resting image" thereof, which is not present in the original emulation target game, for example. The above stoppage may be randomly performed, or may be performed (as one of the above events) when a specific condition is satisfied, for example.

Action Examples of Enemy Character

Figure 27:
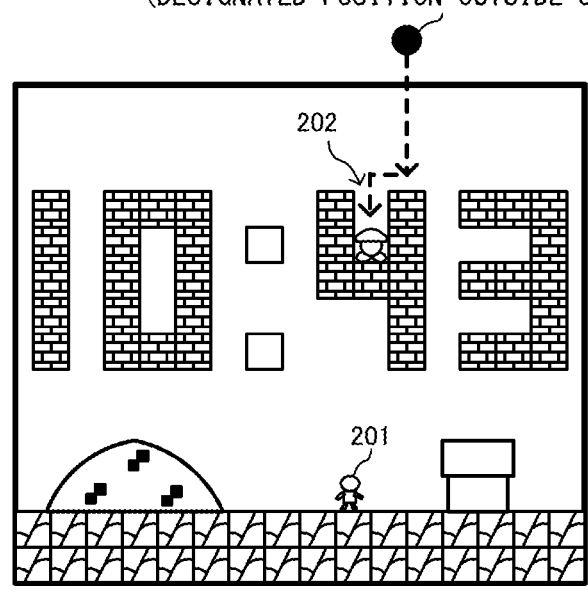
FIG. 27 shows a non-limiting example of a screen in the second mode.

Next, several examples regarding the enemy character in the second mode will be described. Basically, the enemy character 202 performs an action of appearing from the upper side of the screen and moving toward the left end of the screen as described above with reference to FIG. 6. At this time, for example, as shown in FIG. 27, the displayed minute value is at a "40-minute" level, the enemy character 202 that has appeared from the upper side of the screen is caught in a pocket (recess) in the time blocks 206, so that the enemy character 202 is displayed in a state of being unable to move.

Usage Examples of Non-Appearing Characters

Figure 28:
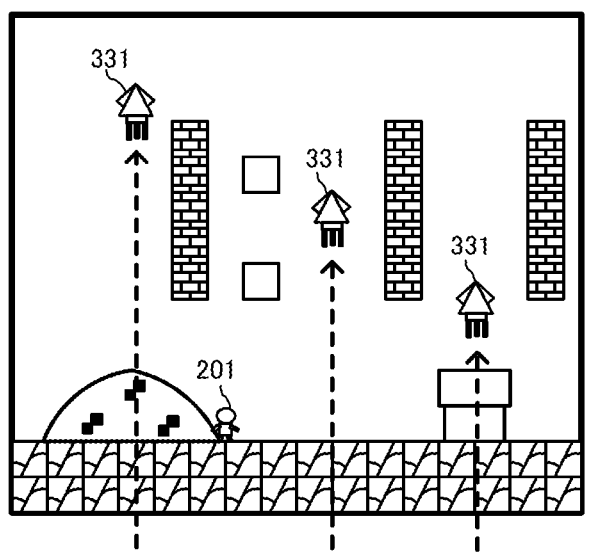
FIG. 28 shows a non-limiting example of a screen in the second mode.

Next, examples in which the non-appearing characters not present in the original emulation target game are used as enemy characters will be described. FIG. 28 shows a screen example in which a dedicated enemy character for the second mode appears. In FIG. 28, an example in which three non-appearing characters 331 appear at a specific time (1:11), is shown. In this example, the three non-appearing characters 331 each appear from the lower side of the screen and move in the directly upward direction. The image data of the non-appearing characters 331 are included in the additional character image data 406 and not included in the emulation target game. Processing is performed as follows. A predetermined enemy character that appears in the emulation target game is associated as a substitute character with the non-appearing character (additional character association designating information 534). Then, through the emulator processing, action control is performed for the substitute character with the appearance position and the movement path designated, and in accordance with the processing result, the image of the substitute character is changed to the image of the non-appearing character to be displayed.

Figure 29:
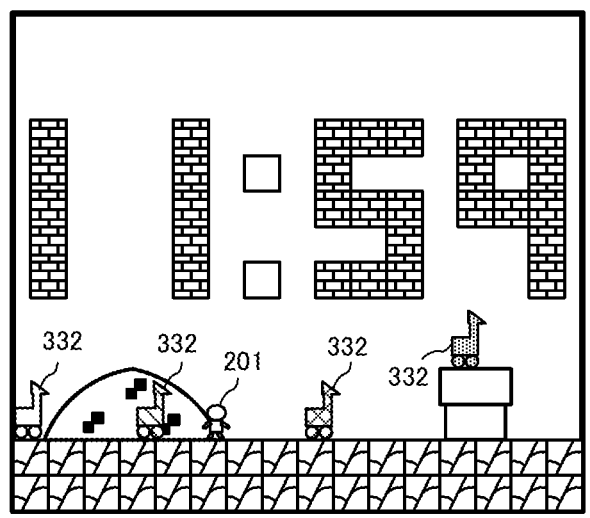
FIG. 29 shows a non-limiting example of a screen in the second mode.
Figure 30:
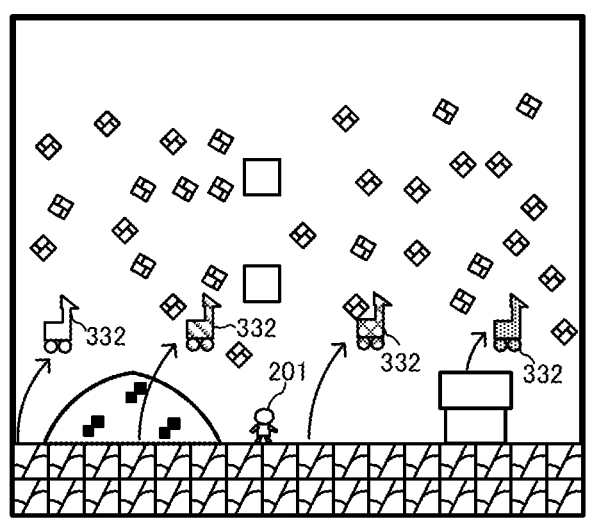
FIG. 30 shows a non-limiting example of a screen in the second mode.
Figure 31:
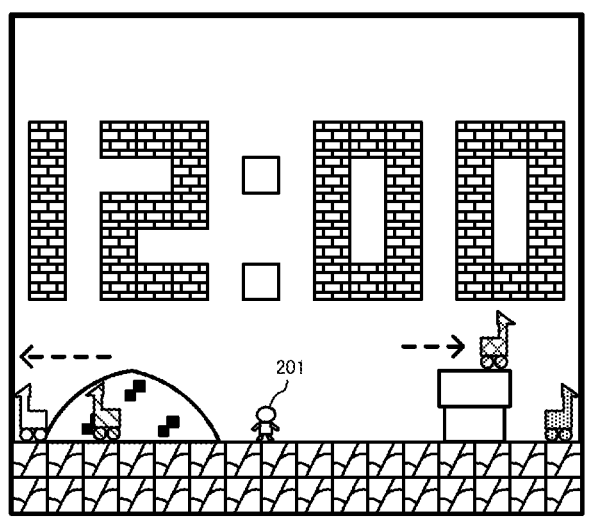
FIG. 31 shows a non-limiting example of a screen in the second mode.

Another application example using such a non-appearing character will be described. In the example described below, a "time announcement" is presented by a special presentation using non-appearing characters. Here, a time announcement of 12:00 is exemplified. FIG. 29 shows an example of a second mode screen a few seconds before 12:00. In FIG. 29, four non-appearing characters 332 appear. These non-appearing characters 332 sequentially appear from the left end of the screen, and move to the positions directly under the respective digits of the time blocks 206. Then, at 12:00, the non-appearing characters 332 jump to hit the time blocks 206, whereby the time blocks 206 are destroyed (image data of broken pieces of the blocks are taken from the ROM data of the emulation target game). As a result, as shown in FIG. 30, a presentation is performed such that the time blocks 206 are destroyed into pieces once and then the broken pieces are gathered together, so that, as shown in FIG. 31, the time blocks 206 are arranged in a shape of "12:00". Thereafter, the non-appearing characters 332 move to the outside of the screen. It is noted that, during the above sequential presentation, the player character 201 keeps stopped substantially at the center position of the screen on the terrain part 204. Also in such processing, the content of the game processing working data 481 in the second mode emulator memory area 505 is changed so as to use substitute characters corresponding to the non-appearing characters, and various types of action control are performed therefor. Then, on the basis of the processing result, the images of the substitute characters are changed to images of the non-appearing characters, and the time announcement presentation is performed as described above.

Examples in Which Game Scenes are Changed

Figure 32:
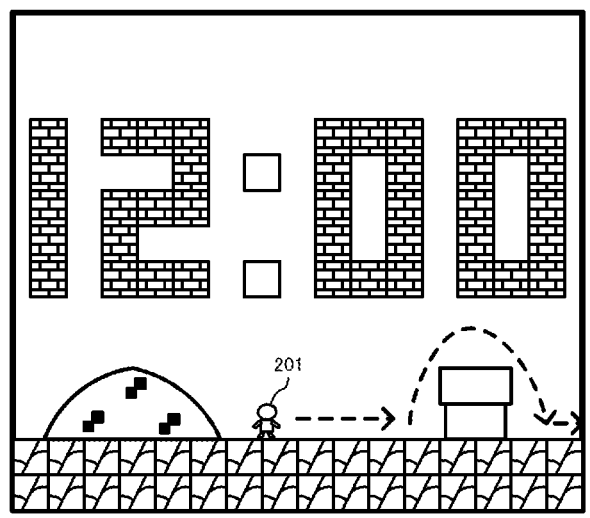
FIG. 32 shows a non-limiting example of a screen in the second mode.
Figure 33:
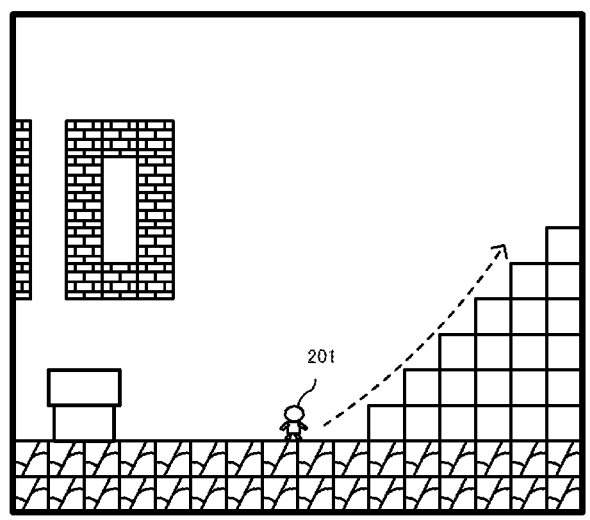
FIG. 33 shows a non-limiting example of a screen in the second mode.
Figure 34:
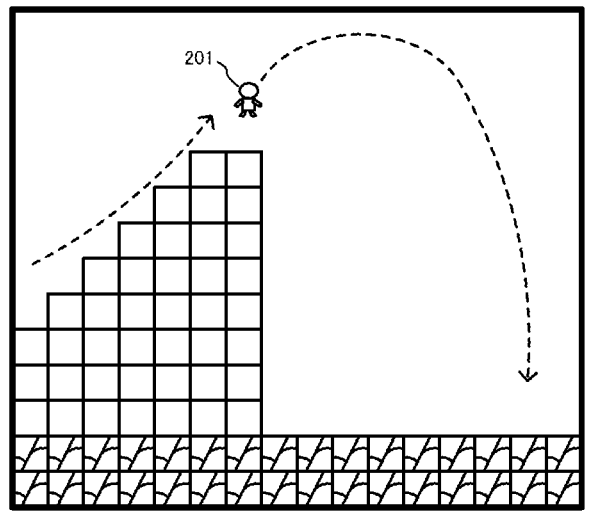
FIG. 34 shows a non-limiting example of a screen in the second mode.
Figure 35:
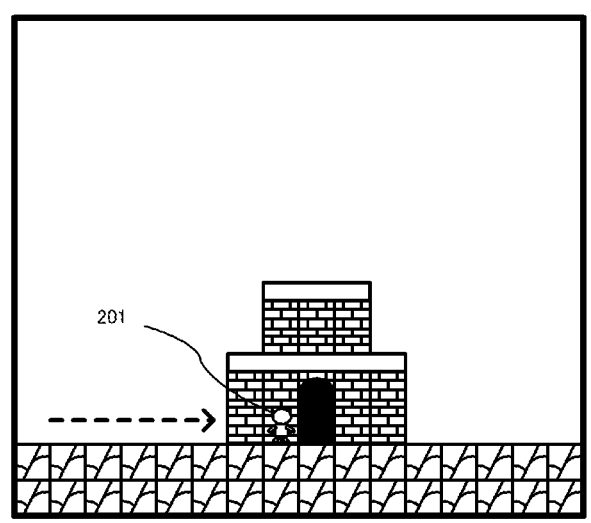
FIG. 35 shows a non-limiting example of a screen in the second mode.

As still other application examples, processing of changing the game scene will be described. For example, a presentation of arriving at a goal point of a game stage (goal scene presentation) is performed at a specific time such as 12:00. In this example, after the time announcement presentation as described above is finished, the player character 201 starts to move toward the right end of the screen as shown in FIG. 32. Along with the movement, the screen is scrolled and stacked blocks are gradually displayed, as shown in FIG. 33. A presentation is performed such that the player character 201 runs up the blocks, jumps from the top and lands on the ground as shown in FIG. 34, and then further moves rightward to arrive at a "castle object" as a goal point as shown in FIG. 35. In this processing, at the time of determining the action control parameter, a point just before the goal point may be designated as the position of the player character 201 in the virtual game space. Then, processing regarding the goal scene presentation may be performed such that the emulator processing result is directly reflected while only the background image is changed.

Besides, for example, when a predetermined time or a predetermined time period has come, the player character 201 may move into the pipe 205 to transfer to a different game stage. For example, at a specific time, the player character 201 may move into the pipe 205 so that the game stage is shifted and the contents of the second mode screen are switched to those for an "underwater stage". In this case, the content of the game processing working data 481 is changed so that the position of the player character 201 in the virtual game space becomes a start point of the underwater stage, and processing is performed by the emulator. In particular, even in the case where the behavior of the player character 201 is different between the ground stage and the underwater stage like the player character 201 "runs" in the ground stage and "swims" in the underwater stage, the behavior reproducibility can be enhanced because the action control is performed on the emulator side.

Thus, the detailed description of processing in the exemplary embodiment has been finished.

As described above, in the exemplary embodiment, while data to be subjected to processing by the emulator are changed, action control for the player character 201 and NPCs and the collision detection processing therefor are performed by the emulator. Then, when the second mode screen is generated on the basis of the processing result, image data of the appearing characters at this time are obtained by directly using those in the ROM data of the emulation target game. Meanwhile, the background image is drawn by using dedicated image data for the second mode. Thus, it becomes possible to execute another application (in this example, the clock application) utilizing the contents of the emulation target game. In addition, the screen can be presented with richer expressions. In addition, since the action control for the player character 201 and the like is performed by the emulator, reproducibility of the actions of the player character 201 and the like in the clock application relative to the emulation target game can be enhanced. In other words, regarding action control for the player character 201, and the like, it becomes unnecessary to newly configure processing for such control on the clock application side, so that the development cost can be reduced. In particular, in the case where the emulation target game is a past game and reproduction of the original is required on an application utilizing the contents thereof, it is not always easy to strictly reproduce, in the present environment, the behavior of the past original program performed in the past original hardware, but the exemplary embodiment enables elimination of such labors. In addition, since the ROM data of the emulation target game is also used in the second mode, the amount of data stored in the flash memory 102 can be reduced.

Modifications

The emulation target game is not limited to a jump action game as described above, but may be a game of another genre in which a predetermined character appears. Then, image data for the player character 201 and/or an NPC may be obtained from the ROM data of the emulation target game, and a dedicated image prepared for a clock application may be used for a background image.

In the above exemplary embodiment, the case of using the additional background image data 405 for all background images in the clock application has been shown. In another exemplary embodiment, the additional background image data 405 may be used for at least some of the background images, and image data of the emulation target game may be directly used for the other background images.

In the above exemplary embodiment, processing results acquired from the emulator process side in the second mode are a result of movement control for each character and a result of collision detection therefor. Then, using these processing results, the second mode screen is generated on the clock application process side. Instead, in another exemplary embodiment, processing until generation of a game screen using background images and appearing character images may be performed once on the emulator process side, and the game image as an output result may be acquired on the clock application process side. Then, the game image may be analyzed on the clock application side, the tiles composing the background images may be changed to corresponding images based on the additional background image data 405, and then the resultant image may be outputted to the display 12. For example, in the case where the emulation target game apparatus performs processing of writing a game image in a frame buffer, a configuration of acquiring a content of the frame buffer of the emulator, changing the content using the additional background image data 405, and then outputting the resultant content to the display 12, may be employed.

In the above exemplary embodiment, the clock application has been shown as an example of an application utilizing emulation processing in the second mode. In another exemplary embodiment, a predetermined application other than the clock application may be executed. For example, a weather forecast application, a pedometer application, or a calculator application may be employed. Also for application images to be displayed in such an application, images and actions of appearing characters may be obtained by directly using those in the emulation target game, and background images may be formed using images dedicated for the application.

The main unit for executing the above-described processing is not limited to the above-described configuration. For example, the above processing is also applicable to an information processing system having a main apparatus, a controller, and a display device as separate components, instead of a single information processing apparatus. Further, the main apparatus may be configured to be communicable with a predetermined server, major processing of the above sequential processing executed by the information processing apparatus 10 may be executed on an apparatus on the server side, and partial processing thereof may be executed by the information processing apparatus 10.

Besides, a general information processing apparatus such as a smartphone may be imparted with the above-described function as an application (for smartphone) having two operation modes, i.e., the first mode and the second mode as described above.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. An information processing apparatus comprising:
a storage medium; and
a processor,
the storage medium storing at least: (a) ROM data including a game program and predetermined pixel pattern blocks for a game, and (b) an emulator program for executing the game on the basis of the ROM data, and
the processor being configured to perform operations comprising:
in a first mode, execute game processing based on the ROM data by the emulator program, and
in a second mode, while causing the emulator program to execute game processing based on the ROM data, execute an application which is different from the game processing to display at least some of the predetermined pixel pattern blocks included in the ROM data, by making a change on data to be processed by the emulator program being executed.

2. The information processing apparatus according to claim 1, wherein
the ROM data includes at least background pixel pattern blocks and character pixel pattern blocks, and
the emulator program is configured to execute the game by generating a background image and a character image on the basis of the ROM data, controlling a character associated with the character image, and displaying a game screen including at least the background image and the character image.

3. The information processing apparatus according to claim 2, wherein
in the first mode, the processor causes the emulator program to control at least a player character, and
in the second mode, the processor executes the application in which at least the character image associated with the player character is displayed.

4. The information processing apparatus according to claim 3, wherein
in the second mode, the processor, while having made a change of locating the player character at a predetermined position, causes the emulator program to control the player character.

5. The information processing apparatus according to claim 3, wherein
in the first mode, the processor causes the emulator program to control the player character on the basis of key data inputted from an operation unit, and
in the second mode, the processor, while having made a change of inputting the key data in a pseudo manner, causes the emulator program to control the player character.

6. The information processing apparatus according to claim 3, wherein
in the second mode, the processor, while having made a change of locating at least one non-player character at a predetermined position, causes the emulator program to control the player character and the non-player character.

7. The information processing apparatus according to claim 3, wherein
processing executed by the emulator program includes processing of collision detection with the player character.

8. The information processing apparatus according to claim 2, wherein
the storage medium further stores an additional character image separately from the character pixel pattern blocks included in the ROM data, and
in the second mode, the processor changes the character image of the character controlled by the emulator program during execution of the game processing, to the additional character image, and displays the additional character image.

9. The information processing apparatus according to claim 2, wherein
the storage medium further stores additional background image data separately from the background pixel pattern blocks included in the ROM data, and
the processor displays an image using the additional background image data, as at least a part of the background image displayed in the second mode.

10. An information processing apparatus comprising:
a storage medium; and
a processor, the storage medium storing at least ROM data for a game and an emulator program for executing the game on the basis of the ROM data, and the processor being configured to perform operations comprising:
  in a first mode, execute game processing based on the ROM data by the emulator program, and
  in a second mode, while causing the emulator program to execute game processing based on the ROM data, execute an application which is different from the game processing and in which at least some of game images included in the ROM data are displayed, by making a change on data to be processed by the emulator program being executed,
wherein the application in the second mode is a clock application.

11. The information processing apparatus according to claim 6, wherein
  the application in the second mode is a clock application, and
  in the second mode, the processor arranges a plurality of the non-player characters in a shape representing a time.

12. The information processing apparatus according to claim 9, wherein
  the application in the second mode is a clock application, and
  in the second mode, the processor displays an image representing a time by using the additional background image data.

13. The information processing apparatus according to claim 10, wherein
  in the second mode, the processor further causes a predetermined event in accordance with a fact that a specific time has come.

14. The information processing apparatus according to claim 1, further comprising a switch for performing a command for mode switching, wherein
  the processor further
    performs the mode switching in accordance with an operation to the switch,
    saves a state of the game processing during a play, when shifting from the first mode to another mode, and
    restarts the game processing from the saved state, when shifting from the other mode to the first mode.

15. The information processing apparatus according to claim 1, the information processing apparatus being a handheld apparatus, further comprising a display configured to display an image and an operation unit for playing the game.

16. An information processing system comprising:
  a storage medium; and
  a processor,
  the storage medium storing at least ROM data including a game program and predetermined pixel pattern blocks for a game and an emulator program for executing the game on the basis of the ROM data, and
  the processor being configured to
    in a first mode, execute game processing based on the ROM data by the emulator program, and
    in a second mode, while causing the emulator program to execute game processing based on the ROM data, execute an application which is different from the game processing and in which at least some of the predetermined pixel pattern blocks included in the ROM data are displayed, by making a change on data to be processed by the emulator program being executed.

17. A computer-readable non-transitory storage medium having stored therein an information processing program to be executed by a processor of an information processing apparatus including a storage medium storing at least ROM data for a game and an emulator program for executing the game on the basis of the ROM data, the information processing program causing the processor to:
  in a first mode, execute game processing based on the ROM data by the emulator program; and
  in a second mode, while causing the emulator program to execute game processing based on the ROM data, execute an application which is different from the game processing and in which at least some of game images included in the ROM data are displayed, by making a change on data to be processed by the emulator program being executed,
  wherein the application in the second mode is a clock application.

18. The computer-readable non-transitory storage medium according to claim 17, wherein
  the ROM data includes at least background image data and character image data, and
  the emulator program is configured to execute the game by generating a background image and a character image on the basis of the ROM data, controlling a character associated with the character image, and displaying a game screen including at least the background image and the character image.

19. The computer-readable non-transitory storage medium according to claim 18, the information processing program further causing the processor to:
  in the first mode, control at least a player character among the characters by the emulator program; and
  in the second mode, execute the application in which at least the character image associated with the player character is displayed.

20. The computer-readable non-transitory storage medium according to claim 19, the information processing program further causing the processor to:
  in the second mode, while having made a change of locating the player character at a predetermined position, perform control of the player character by the emulator program.

21. The computer-readable non-transitory storage medium according to claim 19, the information processing program further causing the processor to:
  in the first mode, perform control of the player character by the emulator program on the basis of key data inputted from an operation unit, and
  in the second mode, while having made a change of inputting the key data in a pseudo manner, perform control of the player character by the emulator program.

22. The computer-readable non-transitory storage medium according to claim 18, the information processing program further causing the processor to:
  in the second mode, while having made a change of locating at least one non-player character other than the player character among the characters at a predetermined position, perform control of the player character and the non-player character by the emulator program.

23. The computer-readable non-transitory storage medium according to claim 18, wherein the storage medium further stores an additional character image separately from the character image included in the ROM data, the information processing program further causing the processor to:
  in the second mode, change the character image of the character controlled by the emulator program during execution of the game processing, to the additional character image, and display the additional character image.

24. The computer-readable non-transitory storage medium according to claim 18, wherein the storage medium further stores additional background image data separately from the background image data included in the ROM data, the information processing program further causing the processor to:
  display an image using the additional background image data, as at least a part of the background image displayed in the second mode.

25. The computer-readable non-transitory storage medium according to claim 22, wherein the application in the second mode is a clock application, the information processing program further causing the processor to:
  in the second mode, arrange a plurality of the non-player characters in a shape representing a time.

26. The computer-readable non-transitory storage medium according to claim 24, wherein the application in the second mode is a clock application, the information processing program further causing the processor to:
  in the second mode, display an image representing a time by using the additional background image data.

27. The computer-readable non-transitory storage medium according to claim 25, the information processing program further causing the processor to:
  in the second mode, cause a predetermined event in accordance with a fact that a specific time has come.

28. An information processing method to be executed by a processor of an information processing apparatus including a storage medium storing at least ROM data for a game and an emulator program for executing the game on the basis of the ROM data, the information processing method causing the processor to:
  in a first mode, perform control so that the emulator program executes game processing based on the ROM data; and
  in a second mode, perform control so as to, while causing the emulator program to execute game processing based on the ROM data, execute an application which is different from the game processing and in which at least some of game images included in the ROM data are displayed, by making a change on data to be processed by the emulator program being executed,
  wherein the application in the second mode is a clock application.

* * * * *